(12) United States Patent
Cancedda et al.

(10) Patent No.: US 8,781,810 B2
(45) Date of Patent: Jul. 15, 2014

(54) SYSTEM AND METHOD FOR PRODUCTIVE GENERATION OF COMPOUND WORDS IN STATISTICAL MACHINE TRANSLATION

(75) Inventors: Nicola Cancedda, Grenoble (FR); Sara Stymne, Linköping (SE)

(73) Assignee: Xerox Corporation, Norwalk, CT (US)

( * ) Notice: Subject to any disclaimer, the term of this patent is extended or adjusted under 35 U.S.C. 154(b) by 507 days.

(21) Appl. No.: 13/189,738

(22) Filed: Jul. 25, 2011

(65) Prior Publication Data

US 2013/0030787 A1    Jan. 31, 2013

(51) Int. Cl.
*G06F 17/28*    (2006.01)
(52) U.S. Cl.
USPC ............... 704/2; 704/3; 704/4; 704/5; 704/7; 704/8; 715/264
(58) Field of Classification Search
USPC .......................................... 704/2–8; 715/264
See application file for complete search history.

(56) References Cited

U.S. PATENT DOCUMENTS

| | | | |
|---|---|---|---|
| 6,182,026 B1 | 1/2001 | Tillmann et al. | |
| 6,917,936 B2 | 7/2005 | Cancedda | |
| 7,447,627 B2 * | 11/2008 | Jessee et al. | 704/10 |
| 7,949,514 B2 | 5/2011 | Pacull | |
| 7,974,844 B2 * | 7/2011 | Sumita | 704/257 |
| 8,352,265 B1 * | 1/2013 | Lin et al. | 704/256.6 |
| 8,442,813 B1 * | 5/2013 | Popat | 704/9 |
| 8,463,598 B2 * | 6/2013 | Wu et al. | 704/10 |
| 8,548,796 B2 * | 10/2013 | Stymne et al. | 704/4 |
| 2002/0099543 A1 * | 7/2002 | Eman et al. | 704/235 |
| 2003/0078778 A1 * | 4/2003 | Emam et al. | 704/251 |
| 2004/0024581 A1 | 2/2004 | Koehn et al. | |
| 2004/0030551 A1 | 2/2004 | Marcu et al. | |
| 2005/0091030 A1 * | 4/2005 | Jessee et al. | 704/4 |
| 2005/0137854 A1 | 6/2005 | Cancedda et al. | |
| 2006/0190241 A1 | 8/2006 | Goutte et al. | |
| 2007/0150257 A1 * | 6/2007 | Cancedda et al. | 704/2 |
| 2007/0265825 A1 | 11/2007 | Cancedda et al. | |
| 2008/0300857 A1 | 12/2008 | Barbaiani et al. | |
| 2009/0175545 A1 | 7/2009 | Cancedda et al. | |

(Continued)

OTHER PUBLICATIONS

El-Kahlout, et al. "Initial Explorations in English to Turkish Statistical Machine Translation" Proceedings of the Workshop on Statistical Machine Translation, Jun. 2006, pp. 7-14.

(Continued)

*Primary Examiner* — Lamont Spooner
(74) *Attorney, Agent, or Firm* — Fay Sharpe LLP

(57) ABSTRACT

A method and a system for making merging decisions for a translation are disclosed which are suited to use where the target language is a productive compounding one. The method includes outputting decisions on merging of pairs of words in a translated text string with a merging system. The merging system can include a set of stored heuristics and/or a merging model. In the case of heuristics, these can include a heuristic by which two consecutive words in the string are considered for merging if the first word of the two consecutive words is recognized as a compound modifier and their observed frequency $f_1$ as a closed compound word is larger than an observed frequency $f_2$ of the two consecutive words as a bigram. In the case of a merging model, it can be one that is trained on features associated with pairs of consecutive tokens of text strings in a training set and predetermined merging decisions for the pairs. A translation in the target language is output, based on the merging decisions for the translated text string.

22 Claims, 11 Drawing Sheets

(56) References Cited

U.S. PATENT DOCUMENTS

| | | | |
|---|---|---|---|
| 2011/0178791 A1* | 7/2011 | Stymne et al. | 704/2 |
| 2011/0238413 A1* | 9/2011 | Wu et al. | 704/10 |
| 2012/0278060 A1* | 11/2012 | Cancedda et al. | 704/2 |

OTHER PUBLICATIONS

Collins. "Discriminative training methods for hidden markov models: Theory and experiments with perceptron algorithms," in Proceedings of the 2002 Conference on Empirical Methods in Natural Language Processing, pp. 1-8.

Lafferty, et al. "Conditional random fields: probabilistic models for segmenting and labeling sequence data," in Proceedings of the Eighteenth International Conference on Machine Learning, pp. 1-8,2001.

Popović, et al. "Statistical machine translation of German compound words," in Proceedings of FinTAL—5th International Conference on Natural Language Processing, 2006, pp. 616-624.

Rabiner. "A tutorial on hidden markov models and selected applications in speech recognition," Proceedings of IEEE, 77(2):257-286, 1989.

Stymne, "German Compounds in Factored Statistical Machine Translation," Proc. of 6th Intern'l Conf. on Advances in Natural Language Processing, pp. 464-475, Aug. 25-27, 2008.

Simard, et al. "Translating with non-contiguous phrases," in Proc. Conf. on Human Language Technology and Empirical Methods in Natural Language Processing, pp. 755-762, 2005.

Taskar, et al. "Max-margin markov networks," in Proceedings of the Seventeenth Conference on Neural Information Processing Systems, Vancouver, Canada, pp. 1-8, 2003.

Tsochantaridis, et al. "Large margin methods for structured and interdependent output variables," Journal of Machine Learning Research 6, 2005, 1453-1484.

U.S. Appl. No. 12/690,504, filed Jan. 20, 2011, Stymne, et al.

U.S. Appl. No. 12/427,149, filed Apr. 21, 2009, Dymetman, et al.

Koehn, et al. "Moses: open source toolkit for statistical machine translation," in Proc. 45th Annual Meeting of the ACL, demonstration session, pp. 177-180, 2007.

Doddington. "Automatic evaluation of machine translation quality using n-gram co-occurence Statistics," in Proceedings of the Second International Conference on Human Language Technology, pp. 228-231, 2002.

El-Kahlout, et al. "Initial explorations in English to Turkish statistical machine translation," in Proceedings of the Workshop on Statistical Machine Translation, pp. 7-14, 2006.

Fraser. "Experiments in morphosyntactic processing for translating to and from German," in Proceedings of the Fourth Workshop on Statistical Machine Translation, pp. 115-119, 2009.

Koehn, et al. "Factored translation models," In Proceedings of the 2007 Joint Conference on Empirical Methods in Natural Language Processing and Computational Natural Language Learning, pp. 868-876.

Koehn. "Europarl: A parallel corpus for statistical machine translation," in Proceedings of MT Summit X, pp. 79-86, 2005.

Larson, et al. "Compound splitting and lexical unit recombination for improved performance of a speech recognition system for German parliamentary speeches," in Proceedings of the Sixth International Conference on Spoken Language Processing, vol. 3, pp. 945-948, 2000.

Papineni, et al. "BLEU: A method for automatic evaluation of machine translation," in Proceedings of the 40th Annual Meeting of the ACL, pp. 311-318, 2002.

Riezler, et al. "On some pitfalls in automatic evaluation and significance testing for MT," in Proceedings of the Workshop on Intrinsic and Extrinsic Evaluation Measures for MT and/or Summarization at ACL'05, pp. 57-64, 2005.

Stymne, et al. "Processing of Swedish compounds for phrase-based statistical machine translation," in Proceedings of the 12th Annual Conference of the European Association for Machine Translation, pp. 182-191, 2008.

Stymne. "A comparison of merging strategies for translation of German compounds," in Proceedings of the EACL 2009 Student Research Workshop, pp. 61-69.

Virpioja, et al. "Morphology-aware statistical machine translation based on morphs induced in an unsupervised manner," in Proceedings of MT Summit XI, pp. 491-498, 2007.

Holmquist et al. "Improving alignment for SMT by reordering ad augmenting the training corpus", Proc. $4^{th}$ Workshop on Statistical Machine translation, ACL, Mar. 31, 2009, pp. 120-124.

Popovic, et al., "Statistical Machine Translation of Serbian-English," Proc. of the SPECOM-2004, pp. pp. 410-414 (2004).

Baroni, et al., "Predicting the Components of German Nominal Compounds," Proc. 15th European Conference on Artificial Intelligence (ECAI 2002), pp. 470-474 (2002).

Koehn, et al., "Empirical Methods for Compound Splitting," Proc. $10^{th}$ Conference on European chapter of the Association for Computational Linguistics (EACL'03), vol. 1, pp. 187-193 (2003).

Stymne, et al., "Productive Generation of Compound Words in Statistical Machine Translation," Proc. $6^{th}$ Workshop on Statistical Machine Translation (WMT '11), pp. 250-260 (Jul. 30-31, 2011).

* cited by examiner

```
# vowels (soft versus hard)
$word =  s/[aouä]/a/g;
$word =  s/[eiyäöé]/e/g;

# consonant combinations and
# spelling alternations
$word =  s/ng/N/g;
$word =  s/gn/G/g;
$word =  s/ck/K/g;
$word =  s/[lhgd] j/J/g;
$word =  s/^ge/Je/g;
$word =  s/^ske/Se/g;
$word =  s/^s[kt]?j/S/g;
$word =  s/^s?ch/S/g;
$word =  s/^tj/T/g;
$word =  s/^ke/Te/g;

# consonants grouping
$word =  s/[ptk]/p/g;
$word =  s/[bdg]/b/g;
$word =  s/[lvw]/l/g;
$word =  s/[cqxz]/q/g;
```

FIG. 5

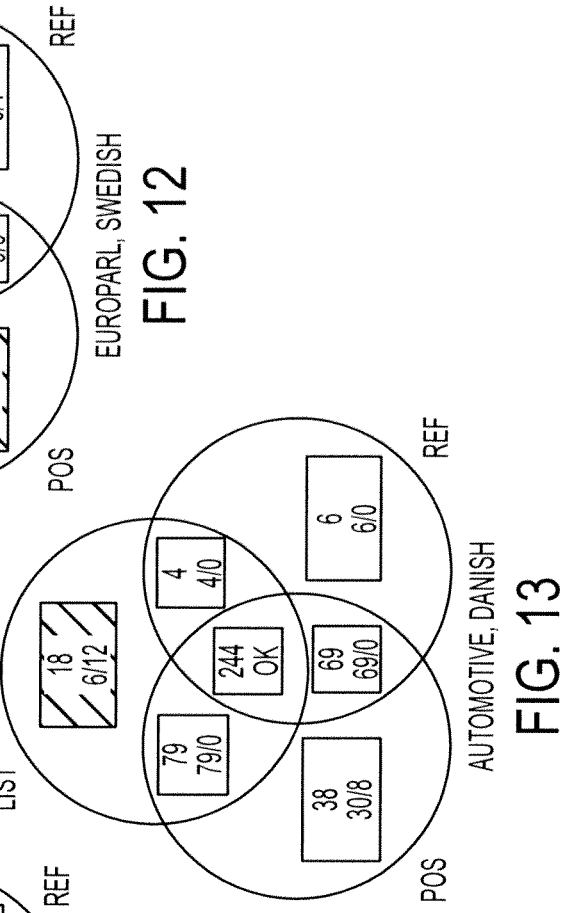
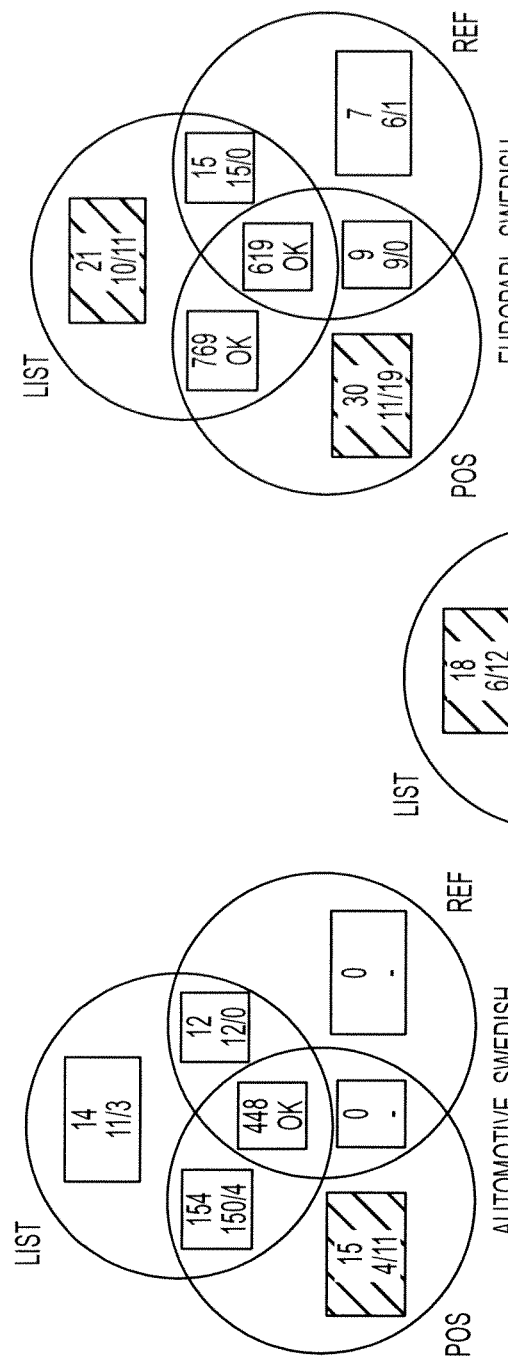
FIG. 11
FIG. 12
FIG. 13

SYSTEM AND METHOD FOR PRODUCTIVE GENERATION OF COMPOUND WORDS IN STATISTICAL MACHINE TRANSLATION

CROSS REFERENCE TO RELATED PATENTS AND APPLICATIONS

The following copending application, the disclosure of which is incorporated herein by reference in its entirety, is mentioned:

U.S. application Ser. No. 12/690,504, filed Jan. 20, 2011, entitled STATISTICAL MACHINE TRANSLATION SYSTEM AND METHOD FOR TRANSLATION OF TEXT INTO LANGUAGES WHICH PRODUCE CLOSED COMPOUND WORDS, by Sara Stymne, Nicola Cancedda, and Tamas Gaál (hereinafter, "Stymne 2011").

BACKGROUND

The present exemplary embodiment is directed to the field of machine translation. It finds particular application in the translation of text into a language which produces closed compound words.

In several natural languages, including most of the Germanic (e.g., German, Danish, and Swedish), Uralic (e.g., Finnish and Hungarian) and Dravidian (e.g., Tamil and Telugu and other languages) language families, so-called closed compound words are very productive. This means that speakers routinely invent closed compound words when using the language. While some common closed compound words do find their way into dictionaries, the vast majority does not, and such compound words are simply interpreted by the reader by decomposing and analyzing them on the fly. This is an obstacle to many statistical machine translation systems translating into those languages, as they can usually only produce words that were observed in the training sample.

Closed compound words are written as single words without spaces or other inter-word boundaries. This is generally not the case in English, where open compounds are used, that is, compound parts are normally written as separate words. A compound word in one language does not necessarily correspond to a compound word in another language. German closed compound words, for example, can have English translations that are open compound words (e.g., Regierungskonferenz, intergovernmental conference), other constructions, sometimes with inserted function words and reordering (e.g., Fremdsprachenkenntnisse, knowledge of foreign languages), hyphenated words (e.g., Kosovo-Konflikt, Kosovo conflict) or single words (e.g., Völkermord, genocide). For example, Fremdsprachenkenntnisse is a closed compound formed by concatenation of three parts: fremd, sprachen and kenntnisse, which are all existing words in the German language (or may be slight modifications of existing words in some cases). The last part of the compound (kenntnisse in this example), is referred to herein as the "head" of the compound word, since it is the part which gives the compound its main meaning. The other parts of the compound modify the head or, where there are more than two parts, may modify one of the other parts.

Compound word parts sometimes have special compound word forms, formed by additions or truncations of letters, by use of an umlaut symbol, or by a combination of these, as in Regierungskonferenz, where the letter -s is added to the first part, Regierung. These forms sometimes coincide with paradigmatic forms, as in Völker which is the plural form of Volk, but sometimes they are unique forms, as in Regierungs, which is only used in compound words.

The extended use of compound words makes them problematic for many applications including machine translation. Phrase-based statistical machine translation (SMT) techniques, for example, rely on bi-phrases which are often harvested automatically from large collections of previously translated texts ("bilingual parallel corpora"), and stored in a database. One part of each bi-phrase is taken from the source text and the other from the target text. These bi-phrases employ multi-word expressions as well as single words. When given a new segment of text to translate, the translation system searches the database to extract all relevant bi-phrases, i.e., items in the database whose source-language phrase matches some portion of the new input. A subset of these matching bi-phrases is then searched for, such that each word of the input text is covered by exactly one bi-phrase in the subset, and that the combination of the target-language phrases produces a coherent translation. A probabilistic model is often used to find an optimal alignment between the source sentence and its translation.

Most research on compound word translation in the field of SMT has focused on translation from a compound wording language, into a non-compound wording one, typically into English. There, compound words on the source side of a training corpus are split into their components and a translation model is learned on the split training corpus. At translation time, compound words in the source segment to be translated are split using the same method adopted for splitting compound words in the training corpus and then translated using the learned model from the decomposed-source into the target.

Translation into a compounding language is more problematic. For translation into a compounding language, the process generally involves splitting compound words on the target (compounding language) side of the training corpus and learning a translation model from this split training corpus from source (e.g., English) into decomposed-target (e.g., decomposed-German). At translation time, the source text is translated using the learned model from source text into decomposed-target text. A post-processing merging step is then used to reconstruct compound words.

The merging step poses various problems. These include the identification of those words which should be merged into compound words and the choice of the correct form of the compound parts. Existing systems used for translating into a compounding language generally produce fewer compound words than occur in normal texts. While this can be due, in part to the absence of the desired compound words from the training data, there are other reasons for the disparity. In particular, the component parts of a compound word may not being aligned correctly (merging systems operate on words which are consecutively arranged). As a result, even when a compound word is the idiomatic word choice in the translation, a machine translation system can, instead, produce separate words, genitive or other alternative constructions, or only translate one part of the compound word. Stymne 2011 addresses the problem of promoting compound words in translations by assuming that the components that are to be merged into a compound word are likely to appear consecutively in the sentence and in the right order. Such arrangements are favored by using specific part of speech (POS) tags for words which are candidates for forming compound words.

A remaining problem is deciding when to perform the merging step, given the sparsity of the training data. False compound words, i.e., compound words that a reader has never seen nor would expect to see formed, can be distracting to the reader. In the same way, compound words which are erroneously split, i.e., which the reader would expect to be merged, are also undesirable.

In Stymne 2011, compound modifiers are marked with special POS-tags based on the POS of the head. If a word with a modifier POS-tag is followed by the corresponding head POS tag, then the two tokens are merged. In another method, lists of known compound words and compound modifiers are maintained. For any pair of consecutive tokens, if the first is in the list of known modifiers and the combination of the two is in the list of closed compounds, then the two tokens are merged (see, Maja Popović, Daniel Stein, and Hermann Ney, "Statistical machine translation of German compound words," in Proc. of FinTAL—5th International Conference on Natural Language Processing, pp. 616-624, Turku, Finland, Springer Verlag, LNCS (2006), hereinafter, "Popović"). The method of Popović, however, tends to over-produce compound words.

The exemplary embodiment provides an improved system and method for making decisions on merging of consecutive tokens into a compound word.

INCORPORATION BY REFERENCE

The following references, the disclosures of which are incorporated herein in their entireties by reference, are mentioned:

Phrase based machine translation systems are disclosed, for example, in U.S. Pat. No. 6,182,026 entitled METHOD AND DEVICE FOR TRANSLATING A SOURCE TEXT INTO A TARGET USING MODELING AND DYNAMIC PROGRAMMING, by Tillmann, et al., U.S. Pub. No. 2004/0024581 entitled STATISTICAL MACHINE TRANSLATION, by Koehn, et al., U.S. Pub. No. 2004/0030551 entitled PHRASE TO PHRASE JOINT PROBABILITY MODEL FOR STATISTICAL MACHINE TRANSLATION, by Marcu, et al., U.S. Pub. No. 2008/0300857, published Dec. 4, 2008, entitled METHOD FOR ALIGNING SENTENCES AT THE WORD LEVEL ENFORCING SELECTIVE CONTIGUITY CONSTRAINTS, by Madalina Barbaiani, et al.; U.S. Pub. No. 2006/0190241, published Aug. 24, 2006, entitled APPARATUS AND METHODS FOR ALIGNING WORDS IN BILINGUAL SENTENCES, by Cyril Goutte, et al.; U.S. Pub. No. 2007/0150257, published Jun. 28, 2007, entitled MACHINE TRANSLATION USING NON-CONTIGUOUS FRAGMENTS OF TEXT, by Nicola Cancedda, et al.; and U.S. Pub. No. 2007/0265825, published Nov. 15, 2007, entitled MACHINE TRANSLATION USING ELASTIC CHUNKS, by Nicola Cancedda, et al. Methods for building libraries of parallel corpora from which bilingual dictionaries can be generated are disclosed, for example, in U.S. Pat. No. 7,949,514, issued on May 24, 2011 (application Ser. No. 11/789,089), entitled METHOD FOR BUILDING PARALLEL CORPORA, by Francois Pacull; and U.S. patent application Ser. No. 12/427,149, filed on Apr. 21, 2009, entitled BI-PHRASE FILTERING FOR STATISTICAL MACHINE TRANSLATION, by Marc Dymetman, et al.

Methods for evaluating the quality of machine translation are disclosed, for example, in U.S. Pub. No. 2005/0137854, published Jun. 23, 2005, entitled METHOD AND APPARATUS FOR EVALUATING MACHINE TRANSLATION QUALITY, by Nicola Cancedda, et al., and U.S. Pat. No. 6,917,936, issued Jul. 12, 2005, entitled METHOD AND APPARATUS FOR MEASURING SIMILARITY BETWEEN DOCUMENTS, by Nicola Cancedda; and U.S. Pub. No. 2009/0175545, published Jul. 9, 2009, entitled METHOD FOR COMPUTING SIMILARITY BETWEEN TEXT SPANS USING FACTORED WORD SEQUENCE KERNELS, by Nicola Cancedda, et al.

Methods for processing compound words in translation are disclosed in Stymne 2011 and in Sara Stymne, "German compounds in factored statistical machine translation," in Proc. GoTAL—6th International Conf. on Natural Language Processing, pages 464-475, Gothenburg, Sweden, Springer Verlag, LNCS/LNAI (2008); and Sara Stymne and Maria Holmqvist, "Processing of Swedish compounds for phrase-based statistical machine translation. In Proceedings of the 12th Annual Conference of the European Association for Machine Translation, pages 180-189, Hamburg, Germany (2008); Maria Holmqvist, Sara Stymne, Jody Foo, and Lars Ahrenberg, "Improving alignment for SMT by reordering and augmenting the training corpus," in. Proc. 4th Workshop on Statistical Machine Translation, ACL (2009).

BRIEF DESCRIPTION

In accordance with one aspect of the exemplary embodiment, a method for making merging decisions for a translation. The method includes providing a translated text string in a target language of a source text string in a source language. The method further includes outputting decisions on merging of pairs of words in the translated text string with a merging system which includes at least one of a set of stored heuristics and a merging model. In the case of heuristics, these can include at least a first heuristic by which two consecutive words in the string are considered for merging if their observed frequency $f_1$ as a closed compound word (e.g., in a training corpus) is larger than an observed frequency $f_2$ of the two consecutive words as a bigram (in the training corpus). The first word of the two consecutive words may also be required to be recognized as a compound modifier. In the case of a merging model, it can be one that is trained on features associated with pairs of consecutive tokens of text strings in a training corpus and predetermined merging decisions for the pairs to predict merging decisions for a new translated text string. A translation in the target language is output, based on the merging decisions for the translated text string.

In another aspect, a translation system includes a decoder which receives as input a source text string in a source language and outputs a translated text string in a target language, based on the source text string. A merging system receives the translated text string and outputs a translation in the target language based on translated text string. The merging system is configured for outputting decisions on merging of pairs of words in the translated text string. The merging system includes at least one of a stored set of heuristics including at least a first heuristic by which two consecutive words in the string are considered for merging if, for example, the first word of the two consecutive words is recognized as a compound modifier and if their observed frequency $f_1$ as a closed compound word is larger than an observed frequency $f_2$ of the two consecutive words as a bigram and a merging model trained on features associated with pairs of consecutive tokens of text strings in a training corpus and predetermined merging decisions for the pairs.

In another aspect, a translation method includes receiving a source text string in a source language and, with a decoder which has been trained with decomposed text strings in a target language, translating the source text string into a translated text string in the target language. The method further includes extracting features for pairs of words in the translated text string and outputting a translation based on the translated text string in which merging decisions for the pairs of words in the translated text string are based on the extracted features, using a merging model trained with a sequence learning algorithm to predict merging decisions, based on extracted features, for pairs of words in the translated text string.

BRIEF DESCRIPTION OF THE DRAWINGS

FIG. 5 illustrates exemplary groups of features which can be used for a closed compounding language, such as Swedish for normalizing Swedish consonants (Perl notation);

FIGS. 11-13 illustrate results, in Venn diagram form, of an evaluation of different heuristics on validation files from three corpora.

DETAILED DESCRIPTION

Figure 1:
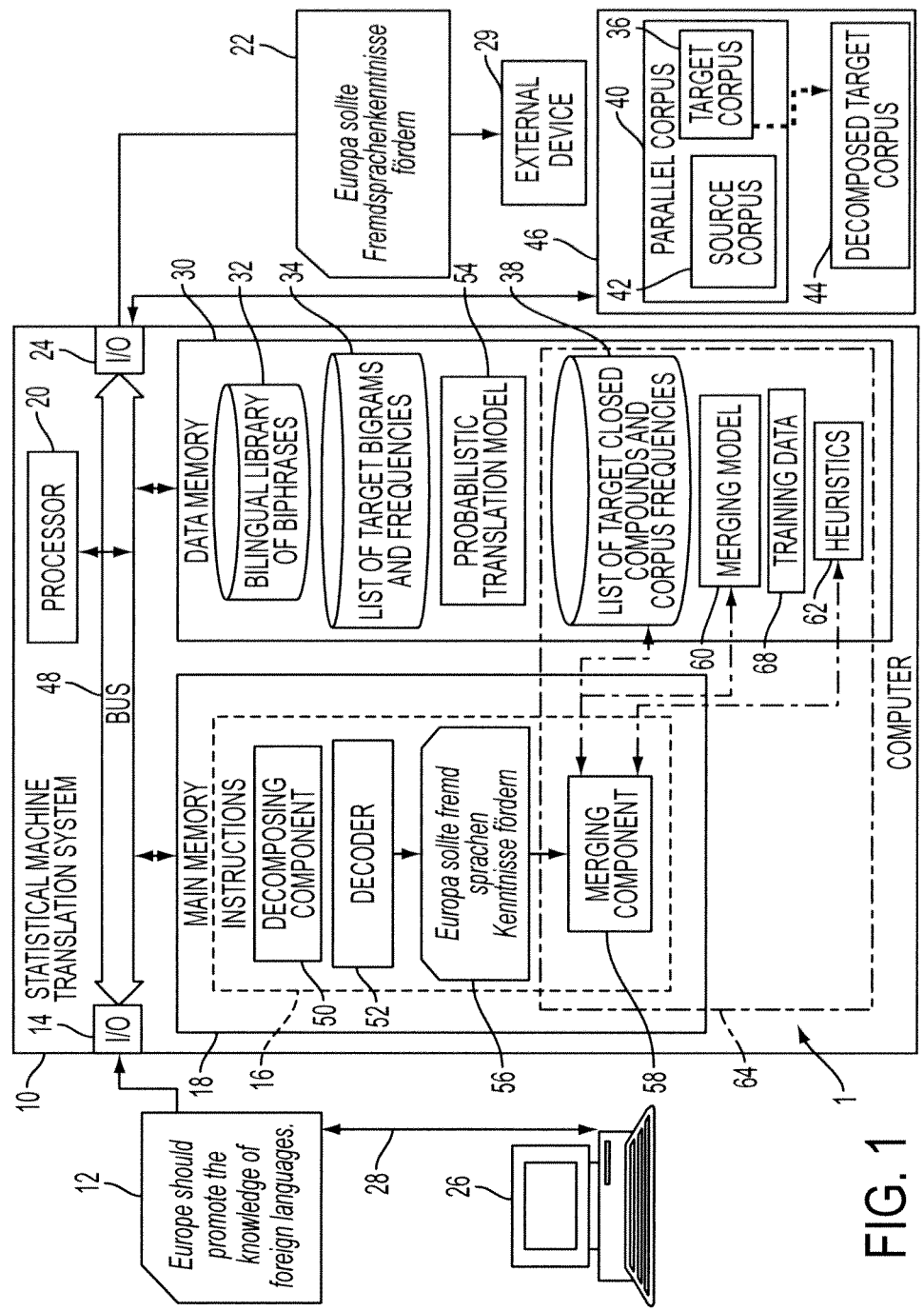
FIG. 1 is a functional block diagram of a machine translation system in its operating environment in accordance with one aspect of the exemplary embodiment.

Aspects of the exemplary embodiment relate to a system and method for machine translation from a source language into a target language which uses closed compound words. Given a new source sentence to be translated, the translation system outputs a translation in which there may be components of split compound words (which a reader would expect to be merged). A compound merging step enables the machine translation system to generate compound words in the output. Two merging methods, which can be used separately or in combination, are disclosed herein. In the first, a heuristic-based method is used for merging components. In the second, a machine learning-based method is used. The training data for the machine learning method includes decisions regarding whether pairs of words of a target sentence should be merged to form closed compound words and the translation system is trained on this training data. This method has similar accuracy to the heuristic method, can generate fewer false compounds more disturbing to the reader than compounds erroneously split, and can operate with no background linguistic resources.

The exemplary method can be particularly useful in productive closed compound languages since it enables closed compounds that have never been seen in the training data to be processed correctly, where one or more of their component parts have been observed, but within a different closed compound.

The term "bi-phrase," as used herein, refers to a source language-target language pair of "phrases" or "text fragments" which are mutual translations of each other, at least in the source to target direction. Each phrase in a bi-phrase can be a single word or several words. Bi-phrases can also contain gaps, each gap corresponding to one or more unspecified words (see, for example, above-mentioned published application Nos. 2007/0265825 and 2005/0137854, incorporated by reference). In the exemplary application, at least some of the bi-phrases contain compound parts on the target side. A "compound part," as used herein, is a word which, when combined with at least one other compound part and application of any specified compounding rules, forms a closed compound word.

A "closed compound word" (or simply, a "closed compound") refers to a word formed from two or more compound parts which are joined together without any white space between the compound parts (optionally with a hyphen "-"), i.e., excluding open compound words. Examples of closed compound words include a concatenation of two words word1 and word2 of the form word1word2, a hyphenation: word1-word2 and more complex forms where one or more letters is added or removed at the end of word1, and/or at the beginning of word2 before concatenating, such as word1±xword2, where ±x represents one or more letters that is/are added or removed.

An "n-gram" is a consecutive sequence of n words (or, more generally, tokens), thus, for example, the term "bigram" refers to a sequence of exactly two words or other tokens.

In the exemplary method, in a translation, only consecutively-positioned tokens (e.g., words) of a target language text string, such as a sentence, are considered as candidates for merging. By "consecutive," it is meant that there are no words or other tokens between the two words under consideration. Various methods can be used for promoting a good relative positioning of the components of translations, such as the method of Stymne 2011. For all pairs of consecutive tokens in such a translation, the exemplary method decides whether to combine them or not. In one aspect of the exemplary embodiment, the decision to merge is heuristic-based. In another aspect of the exemplary embodiment, the decision to merge is formulated as a sequence labeling problem suitable for a machine learning approach. Combinations of the two approaches are also contemplated. Depending on the language and on preprocessing choices, the method may also decide whether to apply any boundary transformations, such as inserting an 's' between components being combined.

Figure 2:
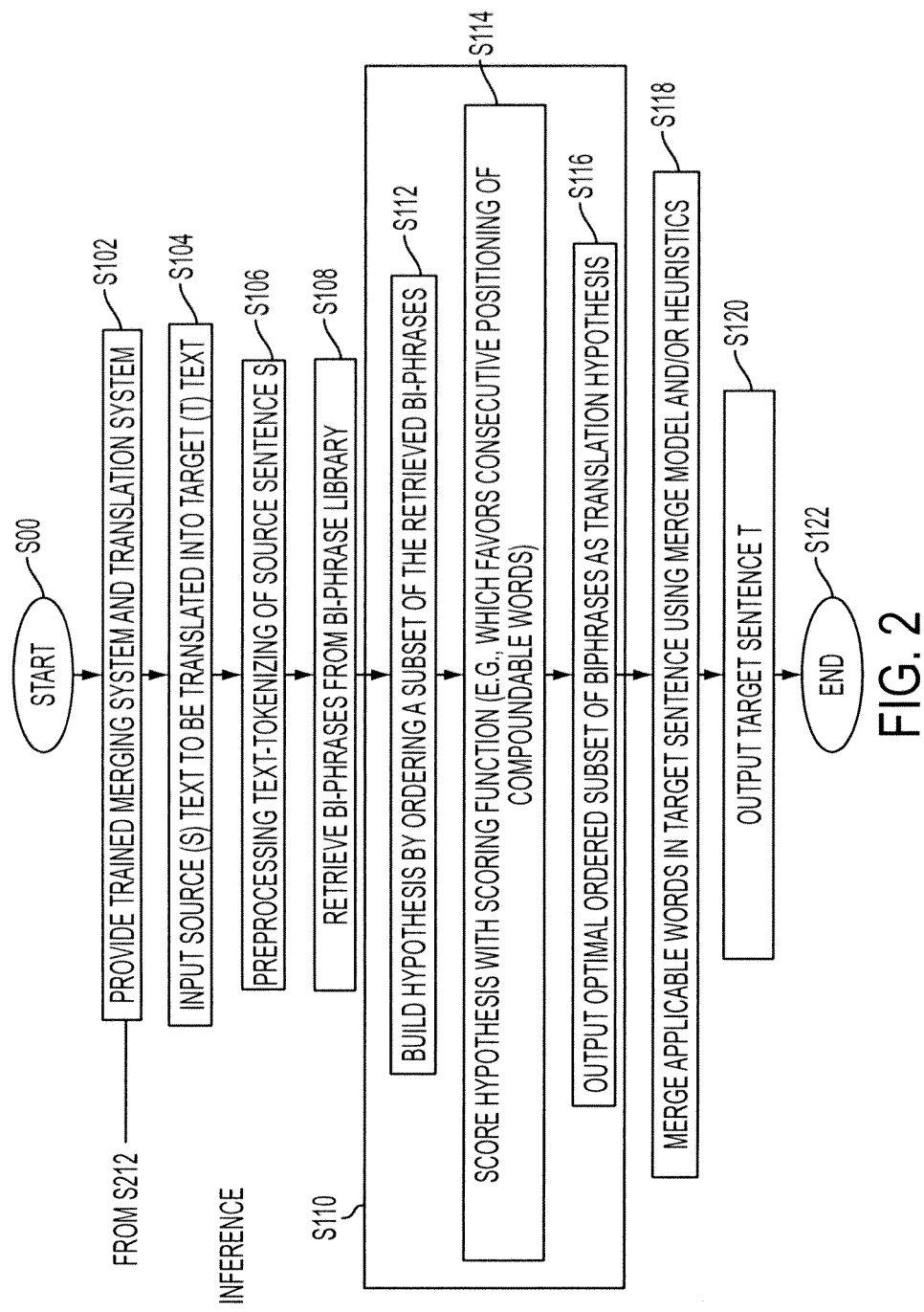
FIG. 2 is a flow chart which illustrates an exemplary method for machine translation in accordance with another aspect of the exemplary embodiment.
Figure 3:
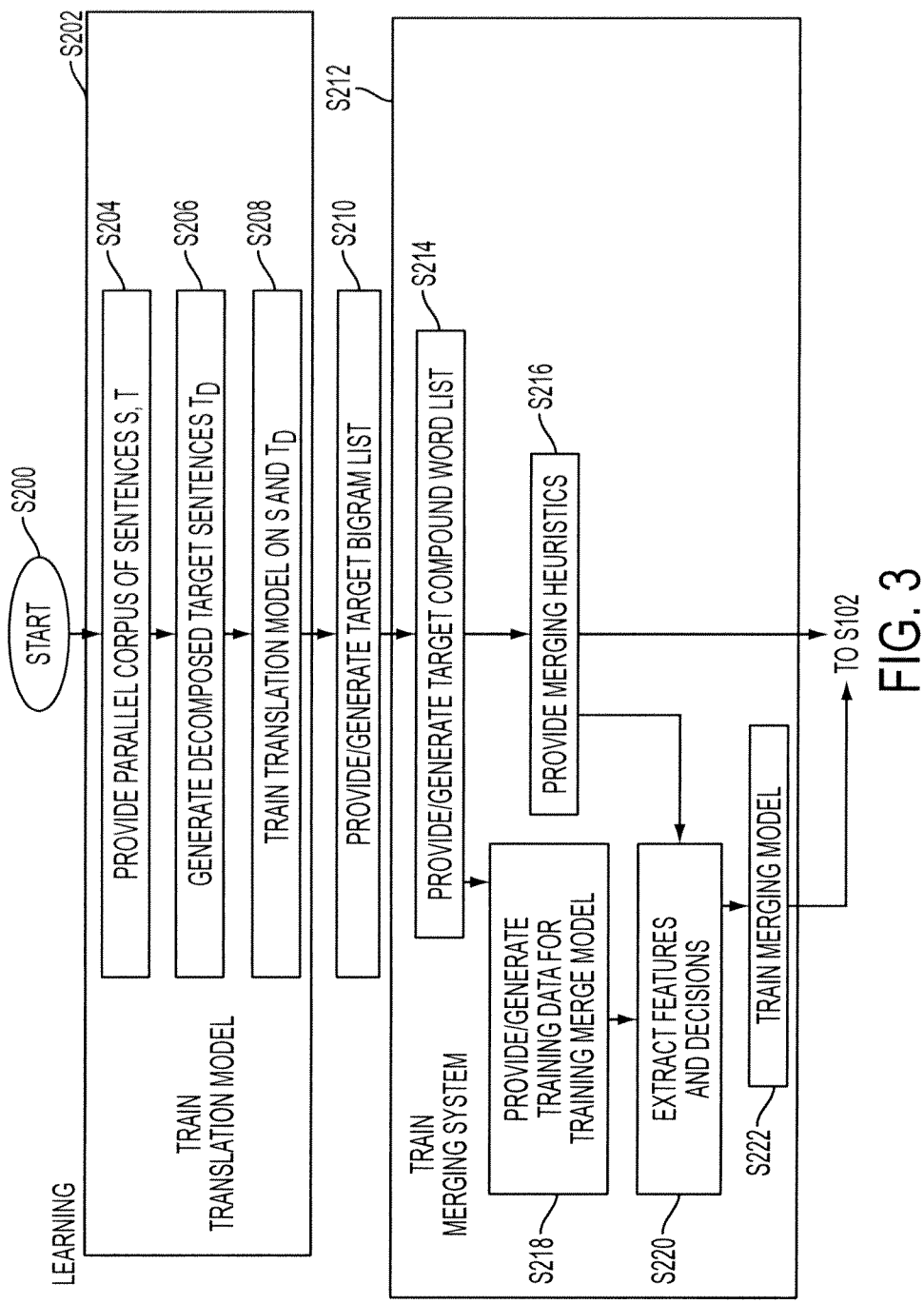
FIG. 3 illustrates a method for generating training data and training the system of FIG. 1.

FIG. 1 is a functional block diagram illustrating an exemplary computer apparatus 1 which hosts an automated natural language translation system 10 for performing statistical machine translation (SMT). In particular, the system 10 may be used for performing a method as shown in FIGS. 2 and 3. The exemplary machine translation system 10 is a phrase-based SMT system, although it is also contemplated that other machine translation methods could be employed.

Text 12 in a source natural language, such as English, which is to be translated into a target language, different from the source language, is input to the apparatus 1 via an input device 14. The text 12 may include one or more sentences, such as a paragraph or an entire document comprising multiple paragraphs, each sentence being made up of a sequence of tokens, such as words, the sentences generally each being terminated by a hard break, such as period, exclamation mark, question mark, or the like.

The translation system 10 may be in the form of hardware or a combination of hardware and software. In the exemplary embodiment, the translation system 10 includes software instructions 16 stored in main memory 18 of apparatus 1, which are executed by an associated processor 20. The instructions 16 generate a translation 22 of the input text 12 in the target natural language (a compounding language), such as German or Swedish. Translated text 22 is output from the system 10 via an output device 24, which may be the same or separate from the input device 14.

Input source language text 12 may be directly input into the natural language translation system 10 (for example, as with a person typing sentences into a computer using a keyboard). Alternatively, input text 12 may be the output of another system, such as, for example, output from a speech recognition system (for example, a speech input device coupled with a speech-to-text converter) or from an optical character recognition (OCR) system (not shown). Or, the text may be input from a database or word document. In one embodiment, the text 12 is input from a client device 26, such as a laptop, desktop, or the like and is communicated to the input device 14 via a wired or wireless link 28 such as a local area network or a wide area network, such as the Internet. Translated text 22 may be returned to the client device 26 or to a separate external device 29.

Data memory 30 of the system 10 stores the input text 12 during processing. The following may also be stored in memory, such as memory 30, or in external memory accessible to the processor 20: a bilingual library 32 of bi-phrases; a list 34 of target language bigrams and their respective frequencies of occurrence in a target language corpus 36 of documents in the target language; a list 38 of target language closed compound words and their respective frequencies of occurrence in the target language corpus 36 of documents, as well as other components of the system 10 described below.

The target language corpus 36 used for generating the lists 34, 38, and for training the system 10, may be a monolingual target language corpus and/or part of a parallel corpus 40, which also includes a source language corpus 42 containing source language documents. In the parallel corpus 40, sentence pairs, i.e., a respective sentence from each of the two corpora 42, 36, have been identified as mutual translations of each other (or, at least a translation in the source to target direction). A decomposed target corpus 44, which may be used for training the system 10, may be stored in memory accessible to the processor 20. The decomposed target corpus 44 may be derived from the target corpus 36 by artificially splitting compound words in the sentences into their component parts. The parallel corpus 40, bilingual library 32, bigram list 34, closed compound list 38, and decomposed target corpus 44 may each be stored in local memory, such as data memory 30 and/or in a remote memory storage device 46 which is communicatively linked to the system 10 via a wired or wireless link.

Components 14, 18, 20, 24, 30 of the apparatus 1 are communicatively linked by wired or wireless links, such as a data control bus 48.

The digital processor 20 can be variously embodied, such as by a single-core processor, a dual-core processor (or more generally by a multiple-core processor), a digital processor and cooperating math coprocessor, a digital controller, or the like. The digital processor 20, in addition to controlling the operation of the computer, executes the instructions 16 stored in memory 18 for performing the method outlined in FIGS. 2 and 3. Memory 18, 30 may include, for example, read only memory (ROM), random access memory (RAM), flash memory, or any combination of the above as a single component or distributed components.

In the illustrated embodiment, the machine translation system 10 includes various software components 18 for translation of the input text 12. As will be appreciated, the components may be separate or combined, and/or additional components may be provided. Specifically, during training of the system, a decomposition component 50 decomposes closed compounds in the target language corpus 36 and labels their component parts in forming the decomposed target corpus 42. These labeled compoundable words are also stored in the bilingual library 32. In the exemplary embodiment, this decomposition and labeling is performed prior to performing translations and thus component 50 need not be present at the translation performing stage. The same or a separate source language-specific decomposition component may, however, be used during translation for decomposing any closed compounds in the input text 12 into their component parts.

A translation component or decoder 52 retrieves bi-phrases from the library 32 to cover words/phrases in the source text 12. In particular, working on a string of contiguous words in the source language, such as a sentence of the input text 12, the decoder 52 accesses the library 32 to retrieve a set of bi-phrases which each include a phrase of one or more words in the target language corresponding to a phrase of one or more words in the source language. The decoder 52 includes a scoring component which evaluates partial and/or full translation hypotheses to identify probable translations of the input text string using a subset of the retrieved biphrases in which each word of the source string is covered by no more than one bi-phrase. The exemplary decoder 52 utilizes a probabilistic model 54, such as a log-linear statistical translation model using a set of feature functions. Model 54 is used for identifying statistically probable translations and thereby to identify an optimal selection and ordering of target phrases, based on the identified bi-phrases and computed feature functions. The model 54 generally identifies a target language string 56 with maximum probability, i.e., a string which globally optimizes the set of feature functions.

The term "optimization," and similar phraseology, is to be broadly construed as one of ordinary skill in the art would understand these terms. For example, optimization is not to be construed as being limited to the absolute global optimum value. For example, optimization of a function may employ an iterative algorithm that terminates at a stopping criterion before an absolute maximum or minimum is reached. It is also contemplated for the optimum maximum or minimum value to be a local maximum or local minimum value.

In one exemplary embodiment, at least one of the feature functions used by the model 54 is based on a restricted set of part-of-speech (RPOS) tags of compoundable words. For example, as described in Stymne 2011, a log linear model may be used in which at least one of the functions is dependent on the presence of RPOS tags of compoundable words and optionally a set of ordering rules, favoring orderings in which one or more compoundable words (generally nouns) are directly adjacent to each other in the target hypothesis with another compoundable word (also a noun) in a head position.

An exemplary decoder 52 which may be used herein is the Matrax™ decoder described in Simard, et al., "Translating with non-contiguous phrases," in Proc. Conf. on Human Language Technology and Empirical Methods in Natural Language Processing, pp. 755-762, Vancouver, British Columbia, Canada (2005)). A version of the Matrax™ decoder which is modified to handle factors on the output side allows a RPOS set to be used as an output factor, as disclosed in Stymne 2011. Other decoders that can use factors can be used, such as that described in Koehn, et al., "Moses: open source toolkit for statistical machine translation," in Proc. 45th Annual Meeting of the ACL, demonstration session, pp. 177-180, Prague, Czech Republic (2007).

In the bilingual library 32, closed compound words may be stored in their compound form, as well as decomposed into their corresponding compound parts. Thus, a bi-phrase in the library 32 may include a target language phrase which includes first and second (or more) target words and a link to a corresponding target closed compound word in the library as well as any specific rules for forming the closed compound word. The compound parts may each be tagged with a restricted part-of-speech (RPOS) tag to indicate that they are compoundable words that are present in at least one closed compound word in the library, as disclosed, for example, in Stymne 2011, and in Sara Stymne and Maria Holmqvist, "Processing of Swedish compounds for phrase-based statistical machine translation," in Proc. 12th Annual Conf. of the European Association for Machine Translation, pages 180-189, Hamburg, Germany (2008) (hereinafter, Stymne and Holmqvist 2008).

Thus, for example, the bi-phrase library 32 could contain the entries:

```
<foreign,(fremd,NP)>,
<languages,(sprachen,NP)>,
<knowledge,(kenntnisse,N)>, and
<knowledge of foreign languages,(Fremdsprachenkenntnisse,N)>.
```

The word fremdsprachenkenntnisse may also be tagged to indicate that it is a compound word formed of (and therefore can be decomposed into) three compound parts: fremd, sprachen, and kenntnisse. Each of these parts has a separate entry in the biphrase library and may be tagged with a restricted POS (RPOS) tag which identifies at least the first two of them as compoundable words. These specific RPOS tags may be of one of two types, NP (compound parts, other than heads) and N (heads and all other nouns), although it is to be appreciated that the tags may be probabilistic in nature, for example where a compoundable word is found to exist as more than one type. In his example, other words are tagged with an X RPOS tag to indicate anything other than the compound-related tags (e.g., X represents everything but N and NP). In generating an alignment, the RPOS tags are retrieved by the decoder 50. For example, when the bi-phrase <languages, (sprachen,NP)> is retrieved as a possible translation for part of an English source text 12 which includes the word "languages", such as "knowledge of the Gaelic languages," the restricted POS tag "NP" enables the system 10 to consider sprachen as a potential part of a closed compound word and the translation component 52 favors positioning it adjacent to (before) a suitable head (labeled with an N).

To provide such a library 32, according to the method described in Stymne 2011, a part of speech (POS) tagger can be run on the target side 36 of the corpus 40 to decompose only those tokens with some predefined POS (e.g., nouns), and then mark, with the special RPOS-tags, whether a component is a head or other part of a compound. As an example, the German compound "Fremdsprachenkenntnisse", originally tagged as a noun (N) could be decomposed and re-tagged before training as: fremd (NP), sprachen (NP), kenntnisse (N). As will be appreciated, when the compound parts are not identical to their corresponding part of the closed compound, they may be appropriately normalized.

In the translation model 54, a POS n-gram language model using the reduced tagset then naturally steers the decoder 52 towards translations with good relative placement of these components. The above scheme assumes that only noun closed compounds are treated, but it could easily be extended to other types of closed compounds. Alternatively, splitting can be attempted irrespective of POS on all tokens longer than a fixed threshold, removing the need of a POS tagger.

The output of the decoder 52 is a "decomposed" target string 56, which is the input for a merging component 58.

The merging component 58 determines whether to merge words in the translated target text 56 to form compound words, using a trained merging model 60, which has been trained to predict merging decisions for a new translated text string 56, and/or a set of heuristics 62 for providing the merging decisions, which may be stored in memory 18 and/or 30. Training data 68 for training the merge model 60 may also be stored in the memory 30. The components 58, 38, 60 and/or 62 which together form a merging system 64, are more fully described below. Briefly, merging component 58 determines, for sequential pairs of words in the translation, whether the pair should be merged to form a closed compound word and in some cases, what transformations should be applied in the merging, based on a set of transformation rules. The output of the merging component is the translated text string 22. The string 22 may be identical to text string 56, if the merging component 58 has found no words which should be merged, or may include one or more closed compound words generated by merging sequential tokens in the string 56.

Figure 4:
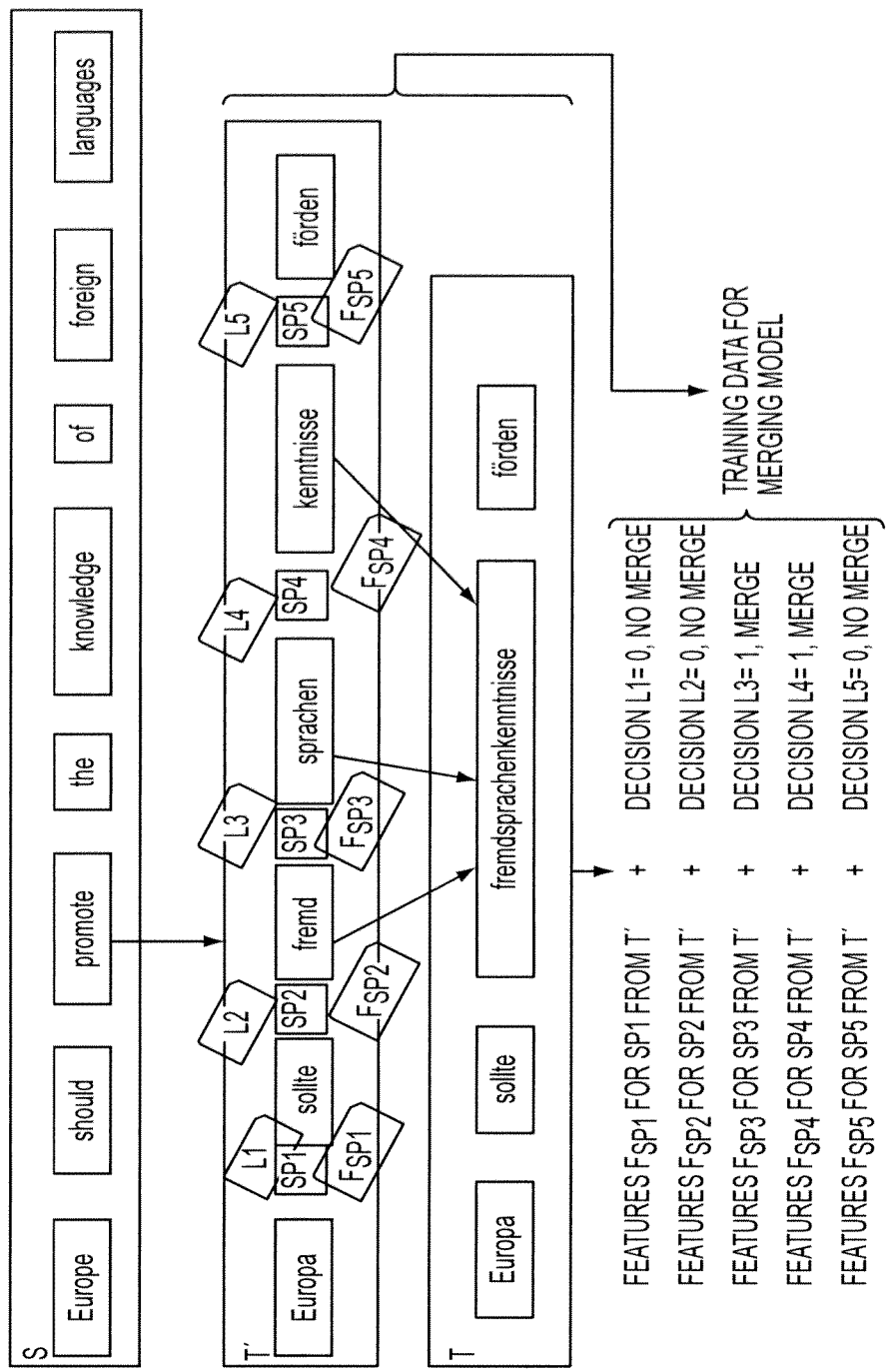
FIG. 4 graphically illustrates the generation of training data for the merging model of FIG. 1.

As illustrated in FIG. 4, a decomposed target string 56 such as string T' can be considered as having a set of separation points SP each SP corresponding to a respective one of the white spaces between a sequential pair of tokens. For a sentence with p tokens, there are thus p−1 separation points. For each of these separation points, a decision is to be made on compounding. In one embodiment (METHOD 1), the merging model 60 is trained (e.g., using a sequence labeling algorithm) on separation point features $F_{SP}$ that are associated with separation points SP in decomposed target text sequences T' (such as sentences) of a training set, such as the decomposed target corpus 42. These training sentences may have been produced by decomposing compound words in a target text T or by using a translation model 54 which generates translations of source text S and which automatically include such decompositions. The separation points SP of the training sentences T' each have a label L corresponding to a compounding decision, which may be derived from looking at the compound word in the corresponding target sentence T from the target side 36 of the parallel corpus.

The merging model 60 is trained on these $F_{SP}$ features to output a compounding decision (e.g., whether or not to merge two or more words in a target sentence and/or what type of merging rules to apply) for a sequence of words forming a new target translation for which there is no decision data L. Exemplary $F_{SP}$ features are described below. An advantage of the merging model 60 is that it is able to provide decisions to merge even when the resulting closed compound word has not been observed in the training data.

In another embodiment (METHOD 2), the merging component 58 applies one or more heuristics (rules) 62 for determining whether a pair of sequential words should be merged to form a closed compound word. The set of one or more heuristics 62 can be stored in memory 30. The decision on whether two words are candidates for merging can be based on observed frequencies of the closed compound (e.g., word1word2) and the corresponding bigram (e.g., word 1 word 2) in target language training data. These frequency-based heuristics can also be used for computing one or more of the $F_{SP}$ features used by the merging model 60. Other methods of combining the two methods are also contemplated.

The output device 24 may be in communication with one or more external devices 26, 29, such as a rendering device, such as one or more of a visual display device (such as a monitor with a screen), a hard copy device (such as a printer), and an audible output device (such as, for example, an audio speaker). Translated strings of text and the entire text, once translated, may be stored in volatile or non-volatile memory 30.

The system 10 may be instantiated in one or more specific or general purpose computers, such as a personal computer, server computer, PDA, or dedicated computing device.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

It will be appreciated that computer 1 may be controlled by operating system software which includes a file management system, such as, for example, a disk operating system, which is part of the operating system software. The file management system may be stored in a non-volatile memory storage device, such as memory 18 and may be configured to cause processor 20 to execute the various functions required by the operating system to input and output data and to store data in volatile memory 30.

FIG. 2 illustrates an exemplary translation method (Inference), which can be preceded by a learning phase, as illustrated in FIG. 3, described below, which can be implemented by the system of FIG. 1. The method of FIG. 2 assumes the creation and storage of an accessible bi-phrase library 32. In one exemplary embodiment, RPOS tags are already associated with words on the target side of all/relevant biphrases in the library 32.

At S102, a trained merging system 64 is provided for merging words to form compound words.

At S104, source text 12 to be translated is input and stored in memory. The source text 12 comprises one or more sequences S (e.g., sentences) of tokens (e.g., words).

At S106, the input text 12 may be preprocessed. This step may include tokenizing the input sequence S to generate a sequence of tokens. In some embodiments, tags are associated with the tokens, such as POS tags.

At S108, a set of bi-phrases is retrieved from the bi-phrase library 32, each bi-phrase covering at least one of the tokens in the source text sequence S. Tokens which are unknown in the bi-phrase library, such as unknown words, digits and units may be replaced with placeholders, which are replaced after translation by the corresponding words, digits and units from the source text.

At S112, a subset of the retrieved bi-phrases is selected for forming a translated text string 56. This step may include the substeps of building a hypothesis using a sub-set of the retrieved bi-phrases (S112), scoring the hypothesis with a scoring function (model 54), which favors consecutive positioning of compoundable words (S114), and outputting the optimal hypothesis (S116). This is the sequence 56, which provides the highest probability score of those tested with the model 54. An alignment which shows which words of the translation are aligned with which words in the source, based on the sub-set of bi-phrases used in the optimal hypothesis, may also be provided.

At S118, merging is applied to construct the final translation with closed compounds. In particular, the merging system 64 is applied to sequence 56 to merge applicable compoundable words as determined based on a merging procedure. As will be appreciated, if no mergeable compoundable words are found, no closed compounds will be created in this step.

At S120, the translation 22, including compound words, if appropriate, is output, e.g., to memory 30 or to an external device 26, 29, such as a display, printer, external memory storage device, specific or general purpose computer, or the like.

The method ends at S122.

A method for training the system 10 will now be described with reference to FIG. 3. The training method may include some or all of the steps illustrated, depending on whether METHOD 1 or METHOD 2 is adopted as the translation merging method.

The training method begins at S200.

At S202, the translation model 54 may be trained, if this has not already been performed. This may include the substeps of providing a parallel corpus 40 comprising source sentences S and corresponding target sentences T (S204), generating a corpus 44 of decomposed target sentences $T_o$ from sentences T (S206), and training the translation model on S and $T_o$ (S208).

At S210, a target bigram list 34 for the selected target language is provided. This may include generating the list from the target corpus 36 of documents and storing the list in memory 30. Each bigram (or bigrams above a given frequency) and its frequency in the corpus is stored. Or, if a list 34 has already been generated, access is provided to the list.

At S212, the merging system 64 is trained. This may include generating a target compound word list 38 for the selected target language if not already provided (S214). For example, the list 38 is generated from the target corpus 36 of documents and the decomposed corpus 44 and stored in memory 30. Or, if a list 38 has already been generated, access is provided to the list. For example, according to the method of Stymne and Holmqvist 2008, the system 64 (or a component of a separate computing device) looks for words above a predetermined number of characters, to exclude short words from consideration (the minimum may be, for example six). For each identified word, the system cuts the word arbitrarily (multiple such cuts can be tested) to form two (or more) elements. There may be one or more constraints set on the elements generated. For example, there may be a constraint on the size of the elements, for example, that each element is at least three characters in length. There may also be a constraint that the part-of-speech tag of the compound word has to match the tag of the last word in the split (when the decomposed sentence is analyzed by a part of speech tagger). The system checks to see if the two (or more) elements are observed individually in the corpus 36 above a threshold frequency. If this is the case, the cut which provides the maximum average (e.g., arithmetic mean) of the two elements' frequencies in the corpus is selected. Then the frequency of the word as a compound in the corpus is stored in list 38 and its bigram frequency can be retrieved from list 34, or otherwise computed. For example, if the compound word fremdsprachen occurs (with at least a threshold frequency) in the corpus 36, and the words fremd and sprachen (or their normalized corresponding words) also appear in the corpus 36, Fremdsprachen and its two compoundable parts fremd and sprachen is included in the list of compound words 38, together with the frequency $f_1$ of fremdsprachen in the corpus 36 and the frequency $f_2$ of the bigram "fremd sprachen" in the corpus 36. Another method for computing these frequencies are described in Maja Popović, Daniel Stein, and Hermann Ney, "Statistical machine translation of German compound words," in Proceedings of FinTAL—5th International Conf.

on Natural Language Processing, pages 616-624, Turku, Finland. Springer Verlag, LNCS (2006). In that method, the geometric mean is used rather than the arithmetic mean.

The compoundable parts generated in the decomposition may be separately stored in the list 38 together with a label as to whether they are observed as a head (e.g., label N) or a compound modifier (e.g., label NP). In some cases, this list 38 of recognized compound modifiers and recognized heads may be supplemented, e.g., manually.

At S216, merging rules (heuristics) 62 for the selected target language may be provided in memory 30. Provision may be made for selection of one or more heuristics from a set of available heuristics. Alternatively, or additionally, at S218 training data 68 is provided or automatically generated for training the merging model 60. The training data 68 includes pairs of target sentences in which pairs of words in one sentence T' are merged in the corresponding sentence T (FIG. 4). At S220, for each pair T',T features are extracted for the whitespaces SP in the unmerged sentence T' and decisions are extracted from observing which word pairs in T' are merged in T. The merging model 60 is trained at S222 on the set of feature vectors and corresponding set of decisions for a set of the training sentences.

The method then proceeds to S104, FIG. 2.

In cases where closed compounds are commonly found in both the source and the target languages, the training method can further include steps for dealing with source language closed compounds (as well as those on the target side), which may include splitting closed compounds on the source side of the training corpus, and learning a translation model from this split training corpus from the decomposed-source into the target language. At translation time, closed compounds in the source segment to be translated are split using the same method adopted for splitting closed compounds in the training set and the source text translated using the learned model from decomposed-source into the target language which uses the restricted POS tags to provide an ordering which favors generating closed compounds, as described above. A post-processing merging step can be used to construct the closed compounds by merging the compoundable words.

Further details of the system and method will now be described.

Merging (S118)

The merging step S118 (FIG. 2) is designed to identify which words should be merged into closed compounds, and choose the correct form of the compound parts. Having an alignment in which the compoundable words are placed side by side and in the correct order, as in the present method (S116), facilitates the merging step. Two merging methods are disclosed, one a heuristics-based method (METHOD 1) and another is a machine learning-based method (METHOD 2). As will be appreciated, not every sequence 56 requires words to be merged. In general, however, the translated text strings 56 output by the decoder 52 have fewer closed compound words (i.e., more bigrams), on average, than the corresponding translations 22 output by the merging system.

Method 1: Heuristic-Based Merging

Various heuristics may be used for deciding when to merge two words of the target sentence 56. By way of example, one or both of the following two heuristics (rules) which are referred to as LIST and POS, may be used for making decisions on merging:

1. List

Under this heuristic, two consecutive tokens in the string 56 are merged if the first token is recognized as a compound modifier, but only if the observed frequency $f_1$ in a corpus of target language documents of the two tokens as a compound word is larger than their frequency $f_2$ in a corpus of target language documents as a bigram. The frequencies $f_1$, $f_2$ can be computed on any available monolingual corpus in the domain of interest, such as corpus 36, as described above. The first requirement (that the first token is recognized as a compound modifier) may be omitted from this heuristic in some embodiments.

A compound modifier is a part of a compound word other than the head. Thus, for example, fremd is a compound modifier in fremdsprachen. The recognized compound modifiers used in the LIST heuristic may be stored in list 38. As noted above, the list 38 may be created during formation of the decomposed target corpus 44. Thus, if a compound word in the target corpus 36 was split during the decomposition, each of the words created by the split (other than the last word, the head) are considered to be recognized compound modifiers in the corpus 36 and can be tagged as such (e.g., with an NP label in the case of a compound modifier which is generated by splitting a compound word that is a noun), and added to the list 38 of recognized compound modifiers.

As an example of applying the LIST hypothesis, in the case of two consecutive words fremd and sprachen in the translated text string 56, the first step is to determine whether fremd is a recognized compound modifier of a compound word in the corpus 36, e.g., by referring to the list 38. The compound word in which it was observed need not, of course, be the same as one created from the two tokens. For example, fremd may have been observed in the splitting of a compound word fremdW1 into fremd W1 or of W2fremdW1 into W2 fremd W1, where W1 is a head of the compound word and W2 is another compound modifier. If this first check is satisfied, then the method proceeds to the second step (if, however, fremd is not on the list 38, the words fremd and sprachen are no longer candidates for merging). In the second step, the system retrieves the frequency $f_1$ of the compound word fremdsprachen created from the two tokens (and optionally any longer words created from three or more of the consecutive tokens). The frequency of $f_1$ can be expressed, for example, as a percentage or ratio of all words (unigrams) in the corpus 36. The system also retrieves the frequency $f_2$ for the words fremd and sprachen (or their normalized corresponding words). This is the frequency with which the two words appear in the corpus 36, as a bigram (fremd sprachen) expressed, for example, as a percentage or ratio of all bigrams in the corpus 36. In some cases $f_2$ may be 0. Then, if $f_1$ is larger than $f_2$, fremd and sprachen are merged together to form fremdsprachen.

2. POS

Under this heuristic, two consecutive tokens in the string 56 are merged if a compound modifier sequentially precedes a compound head. This heuristic can be according to the method described in Stymne 2008 and Stymne 2011.

For example, one or more consecutive compoundable words that are compound modifiers (e.g., type NP) are merged with a consecutive head (e.g., type N) which meet any specific merging rules. As in Stymne, RPOS tags are assigned to the words in the translation 56 from a predefined RPOS tagset, which can be based solely on nouns (e.g., three RPOS tags: N, NP, and X for all other parts of speech) or may also include specific RPOS tags for other parts of speech which may be compounded in the language of interest, such as adjectives and verbs. In this case, the RPOS tagset could be (N, NP, V, VP, A, AP, X) where A, AP, V, and VP are the tags for adjectives and verbs, defined in the same way as the N and NP tags, i.e., two consecutive tokens with respective tags V and VP are merged. For example, applying the POS heuristic, the text string: Europa sollte fremd sprachen kenntnisse förden could be labeled Europa(N) sollte(X) fremd(NP) sprachen(NP) kenntnisse(N) förden(X) using the RPOS tagset (N, NP, and X). Since kenntnisse (N) is labeled (based on occurrences in compound words in the training corpus) as a candidate head and is preceded by one or more candidate compound modifiers sprachen(NP) and fremd(NP), the POS heuristic would merge them to form fremdsprachenkenntnisse.

Figure 6:
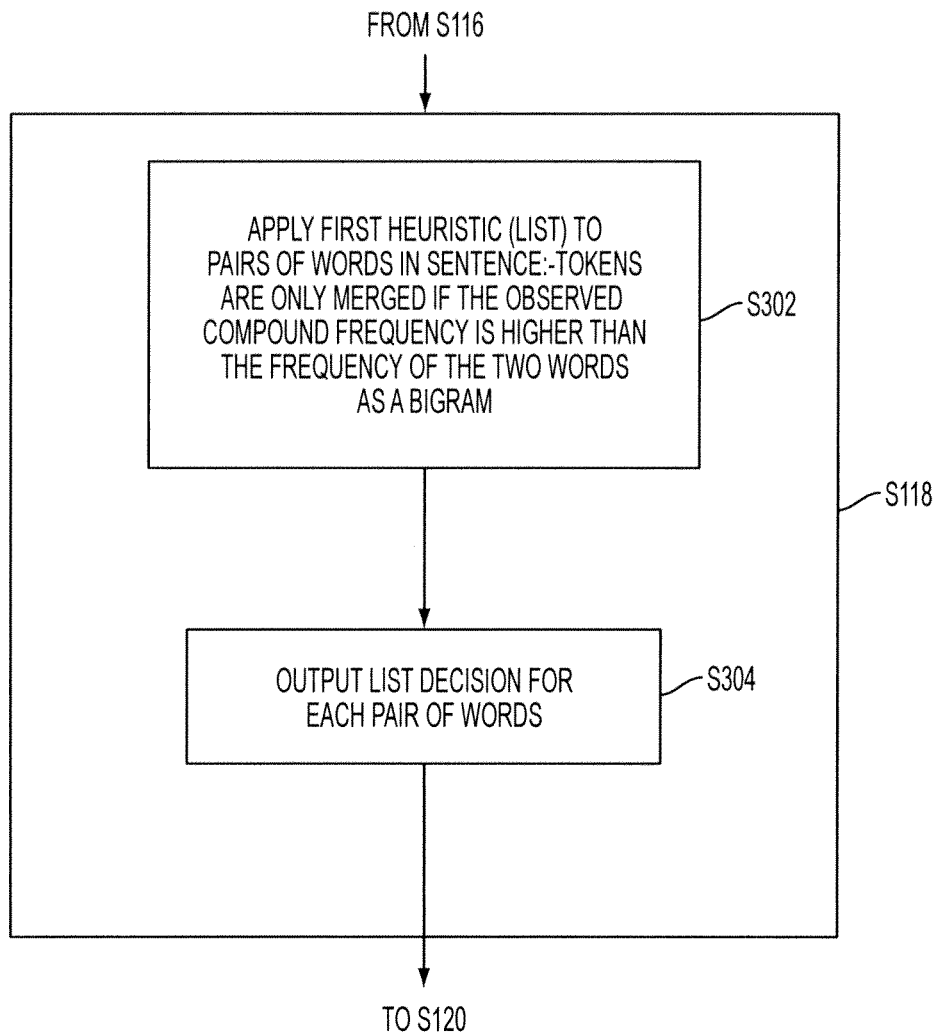
FIGS. 6-10 illustrate exemplary methods for combining the outputs of two or more merging methods to generate a decision on whether to merge pairs of target words in forming a translation which can be used in the method of FIG. 2.
Figure 7:
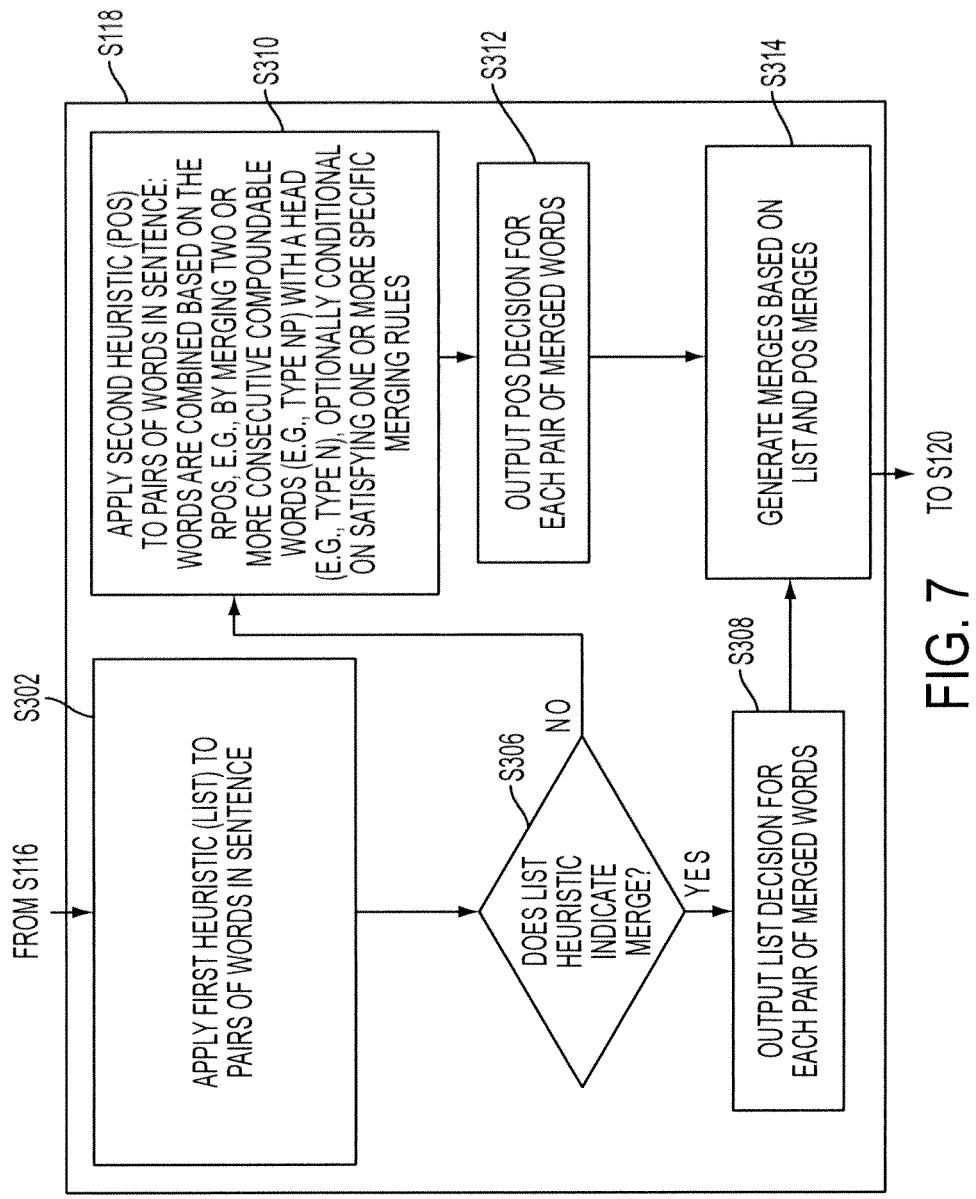

In some embodiments, only the LIST heuristic is used, as illustrated, for example in FIG. 6. Specifically, at S302 the LIST heuristic is applied to each pair of words in the string 56, as described above, and at S304, the LIST decision is output as the merging decision. In another embodiment, both the POS and LIST heuristics are used, since these two methods may lead to complementary sets of false negatives. In the exemplary embodiment, the two heuristics can be combined as follows: two consecutive tokens are merged if they would be combined by either the list-based heuristic LIST or the POS-based heuristic POS. For example, as shown in FIG. 7, the LIST heuristic, as described above, is applied (S302). If this indicates a merge (S306), the decision MERGE is output (S308), if not, then the POS heuristic, as described above, is applied (S310). Any additional merges found by the POS method are output (S312) and the combined outputs result in a list of merges (S314).

In other embodiments, a simpler heuristic (REF) may be used, alone or in combination with other heuristics. For example, this may be a heuristic that merges if the compound is found in the reference translation. This is similar to LIST, but in this heuristic, two consecutive tokens are merged if their compound appears in the target corpus 36, i.e., no requirement for f1 to be greater than f2. However, this heuristic, on its own, tends to merge too frequently.

In other embodiments (described below) the heuristics-based method (one or more heuristics) is combined with the sequence labeling method (METHOD 2) to determine merging decisions.

Method 2: Compound Merging Based on Features and Sequence Labeling

In this method, at S118, compound merging can be considered as a sequence labeling problem. The merging model 60 thus computes an optimal set of merging decisions over all pairs of words (tokens) in the target text string 56.

Included in the sequence 56 are separation points SP between consecutive tokens. In a simple formulation, where components are not normalized upon splitting in the preprocessing phase (S206), each separation point receives a binary label encoding whether the two tokens should be merged. Thus for example, in a sequence containing n consecutive word tokens, n−1 separation points can be given labels L (FIG. 4).

Consider, for example, translating into German, the English sentence: "Europe should promote the knowledge of foreign languages." Assuming that the training corpus 42, 36 did not contain occurrences of the pair ("knowledge of foreign languages","fremdsprachenkenntnisse") but contained occurrences of ("knowledge","kenntnisse"), ("foreign", "fremd") and ("languages","sprachen"), then the translation model 54 from English into decomposed-German should be able to produce: "Europa sollte fremd sprachen kenntnisse fördern." Separation points SP1, SP2, SP3, SP4, and SP5 can be assigned to the spaces between the sequential pairs of words (FIG. 4).

The merging of words to form compound words can then be considered as one of making a series of inter-related binary decisions, one for each pair of consecutive words, each deciding whether the whitespace SP1, SP2, SP3, SP4, and SP5 between the two words should be suppressed (label "1"), e.g., by eliminating the white space or otherwise forming a closed compound word, or not (label "0"). In the case above, the correct labels L1, L2, L3, L4, L5 for the sentence would be {0,0,1,1,0}, reconstructing the correct German: Europa sollte fremdsprachenkenntnisse fördern. It may be noted that nouns in German are capitalized. This can be dealt as a further "truecasing" post-processing step.

In the case where components are normalized upon splitting (for example, by adding or removing a letter), then labels can be other than binary, each label coming from a set describing all local orthographic transformations possible for the language under consideration.

For example, in Swedish the transformations that can occur at word boundaries when a merge decision is taken can be associated with respective labels, as exemplified in Table 1.

TABLE 1

Labels corresponding to local modifications of the compound words at the component boundary

| LABEL | OPERATOR |
| --- | --- |
| 0 | no merge |
| 1 | simple concatenation (as for the binary case above) |
| 2 | +- |
| 3 | +s |
| 4 | −a |
| 5 | −e |
| 6 | a/e |
| 7 | a/u |
| 8 | a/o |
| 9 | e/s | where
+x means addition of x to the end of the first word in the pair and elimination of the white space,
−x means removal of x from the end of the first word in the pair and elimination of the white space, and
x/y means replacement of x with y at the end of the first word in the pair and elimination of the white space.

A simple concatenation indicates that the white space is eliminated in the merge. "+−" means that the white space is replaced with a dash. Each transformation can thus be associated with a possible label in the label set.

As an alternative, a two-stage decision process is contemplated, whereby first a binary labeling (1,0) is performed to decide where to merge and where not, and in a second step a decision is made as to what transformation to apply, if any, in those cases where the first pass decided to merge. Thus, for example, in the Swedish case above, after a decision is made to merge, one of the labels 1-9 is applied. In this embodiment, the sequence labeling algorithm may merely identify the binary decision and a separately trained component can then determine the applicable rule (e.g., from 1-9) for forming the closed compound word.

The labeling L of the translation 56 is based on features associated with the separation points SP. Each separation point between a pair of words is represented by a set of features. The assigned features can be selected from a predetermined set of features, or represented, for example, as a vector in which each feature is assigned a value corresponding to one of a finite set of possible values. The optimal choice of features in the feature set may be developed through empirical testing. Some of these features may be based on parts of speech, these can include conventional parts of speech POS tags taken from a finite set, such as (noun, pronoun, verb, adjective, adverb, preposition, conjunctions, determiner), or the restricted RPOS set described above (e.g., N, NP, X).

An exemplary set of features from which features $F_{SP}$ are assigned to each whitespace, could include one or more (or all) of the following features, below. Here, −1 refers to the word before the merge point, and +1 to the word after. Examples of the feature values ($F_{SP}1$) are given in bold for an example whitespace SP1:

1. surface words: word−1, word+1 (Europa, sollte)
2. part-of-speech: POS−1, POS+1 (Proper, Verb or X,X)
3. character n-grams around the merge point, each character n-gram comprising n characters from the end of word−1 and m characters from the start of word+1, wherein at least one of m and n is at least 1 or at least 2, for example, n+m is at least 2 or at least 3, e.g.:
   a. 3 character suffix of word−1 (opa)
   b. 3 character prefix of word+1 (sol)
   c. combinations crossing the merge points: 1+3 (a+sol), 3+1(opa+s), 3+3 characters (opa+sol)
4. as for ordinary character n-grams in 3, but using normalized character n-grams around the merge point, where characters are replaced by phonetic approximations, and grouped into groups with similar phonetic distribution. Exemplary transformations of this type are shown in FIG. 5 were a square bracket implies any of the characters within it. This may be applied only for Swedish, although using these features with other languages would not invalidate the method, since during the training, the system automatically learns the best features for making the decisions) (e.g., if Europa was Europå, this would be normalized to Europa in its normalized form in Table 5, before computing the feature values for 3).
5. frequencies from the training corpus, involving word−1 and/or word+1 e.g., binned (quantized) by the following method: floor (10(log$_{10}$(freq)) if freq>1 else freq (the "floor" is the next lowest integer, i.e., 14.3 is rounded to 14. Using a logarithm multiplied by 10 provides a suitable range, although other ways for binning frequencies could be used), e.g.:
   a. 2-gram, word−1,word+1 (frequency of the bigram Europa sollte in corpus 36)
   b compound resulting from merging word−1,word+1 (frequency of Europasollte in corpus 36)
   c. word−1 as a true prefix of words in the corpus, e.g., having a threshold presence in the training corpus in combination with one or more other known words in the training corpus (frequency of EuropaW in corpus 36, where W represents any word)
   d. word+1 as a true suffix of words in the corpus (frequency of Wsollte in corpus 36, where W represents any word)
6. frequency comparisons of two different frequencies freq1 and freq2 the training corpus. This can be performed using the following categories:
   freq1<freq2,
   freq1=freq2,
   freq1>freq2,
   both freqs 0
where each frequency comparison may be encoded using four distinct bits in the binary feature vector
freq1 and freq2 can be selected from the following:
   a. word−1,word+1 as 2-gram vs. compound (suppose Europa sollte is more frequent in corpus 36, than Europasollte, then freq1>freq2, i.e., its feature value is (0,0,1,0))
   b. word−1 as true prefix vs. single word (suppose Europa is more frequent in corpus 36, than EuropaW, then freq1>freq2, i.e., feature value is 1)
   c. word+1 as true suffix vs. single word (suppose sollte is as frequent (within a predetermined variation) in corpus 36 as Wsollte, so freq1=freq2, i.e., feature value is (0,0,1,0).

At least one and generally a plurality of these features (or selected ones thereof) and known decision labels L (e.g., selected from 0,1 or labels 0-9) are used in training (S218, FIG. 3) to train the merging model 60. Each feature can be expressed in binary form and the set of features can be expressed as a binary vector (each feature may thus occupy multiple elements of the vector, especially in the case of binned frequencies). A compressed form of the vector can be used, where only the "1" values in the vector are stored. The model trained on these vectors and decisions L is then able to output a label L (decision on merging), e.g., using labels from the same set used in training, for each whitespace SP (i.e., consecutive pair of words) of a new translation 56 (where at least one or all of the decision labels L are unknown), based on the relevant features $F_{SP}$.

While in principle each merging decision L could be addressed independently, in the exemplary embodiment, a decision taken at one point influences merging decisions in neighboring separation points. For this reason, instead of a simple (binary or n-ary) classification problem, a sequence labeling formulation is employed. A sequence labeling algorithm suitable for performing the exemplary method can be selected from a variety of algorithms, including: Hidden Markov Models (HMMs) (see, e.g., Lawrence R. Rabiner, "A tutorial on hidden Markov models and selected applications in speech recognition," Proc. IEEE, 77(2):257-286, 1989); Conditional Random Fields (CRF) (see, e.g., John Lafferty, et al., "Conditional Random Fields: Probabilistic Models for Segmenting and Labeling Sequence Data," in Proc. 18th Intern'l Conf. on Machine Learning (ICML2001), Williamstown, Mass., 2001); Structured perceptrons (see, e.g., Michael Collins, Discriminative Training Methods for Hidden Markov Models: Theory and Experiments with Perceptron Algorithms, in Proc. 2002 Conf. on Empirical Methods in Natural Language Processing (EMNLP02), Philadelphia, Pa., 2002); Structured support vector machines (SVMs) (see, e.g., Ioannis Tsochantaridis, et al., "Large margin Methods for Structured and Interdependent Output Variables," J. Machine Learning Research, 6, 2005); and Max-Margin Markov Networks (see, e.g., Ben Taskar, et al., "Max-Margin Markov Networks," in Proc. 17th Conf. on Neural Information Processing Systems (NIPS2003), Vancouver, Canada, 2003), and others.

All the methods above assume an initial phase of parameter estimation, at the end of which all model parameters are frozen, and the learned model 60 can be used in operations to perform inference.

By way of example, the use of Conditional Random Fields (CRF) is described below. This widely accepted method has good scaling capabilities and is appropriate to use in the presence of strongly redundant and overlapping features.

Figure 8:
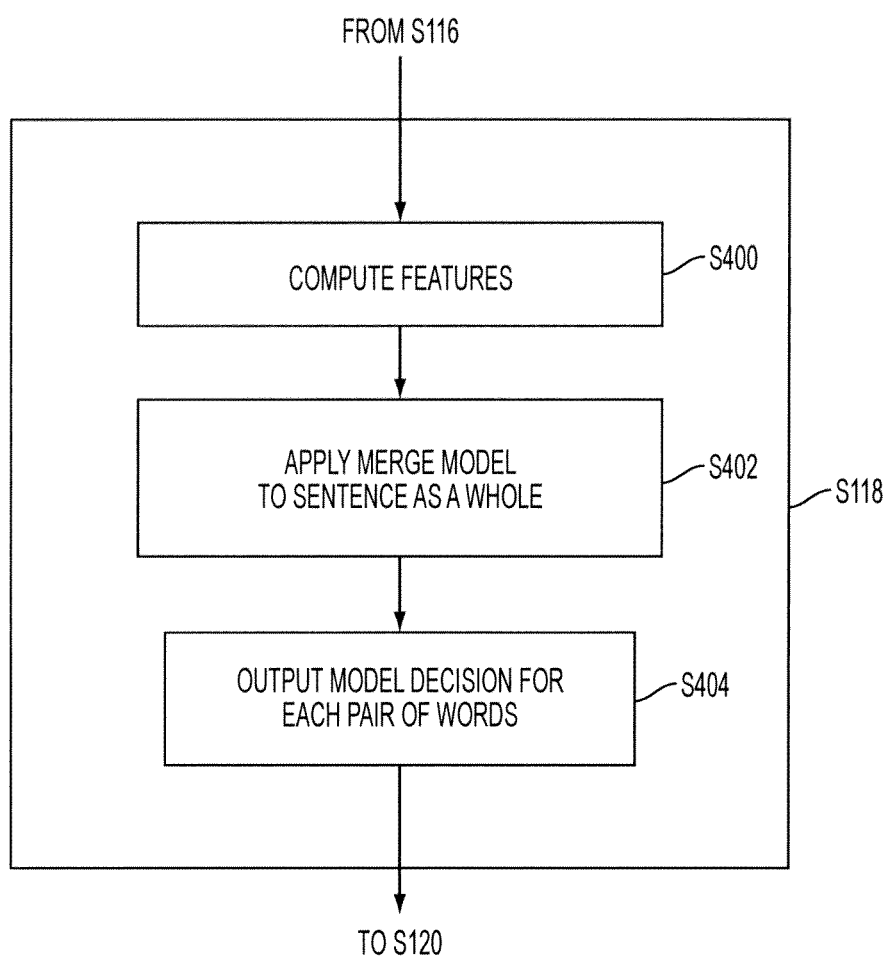
Figure 9:
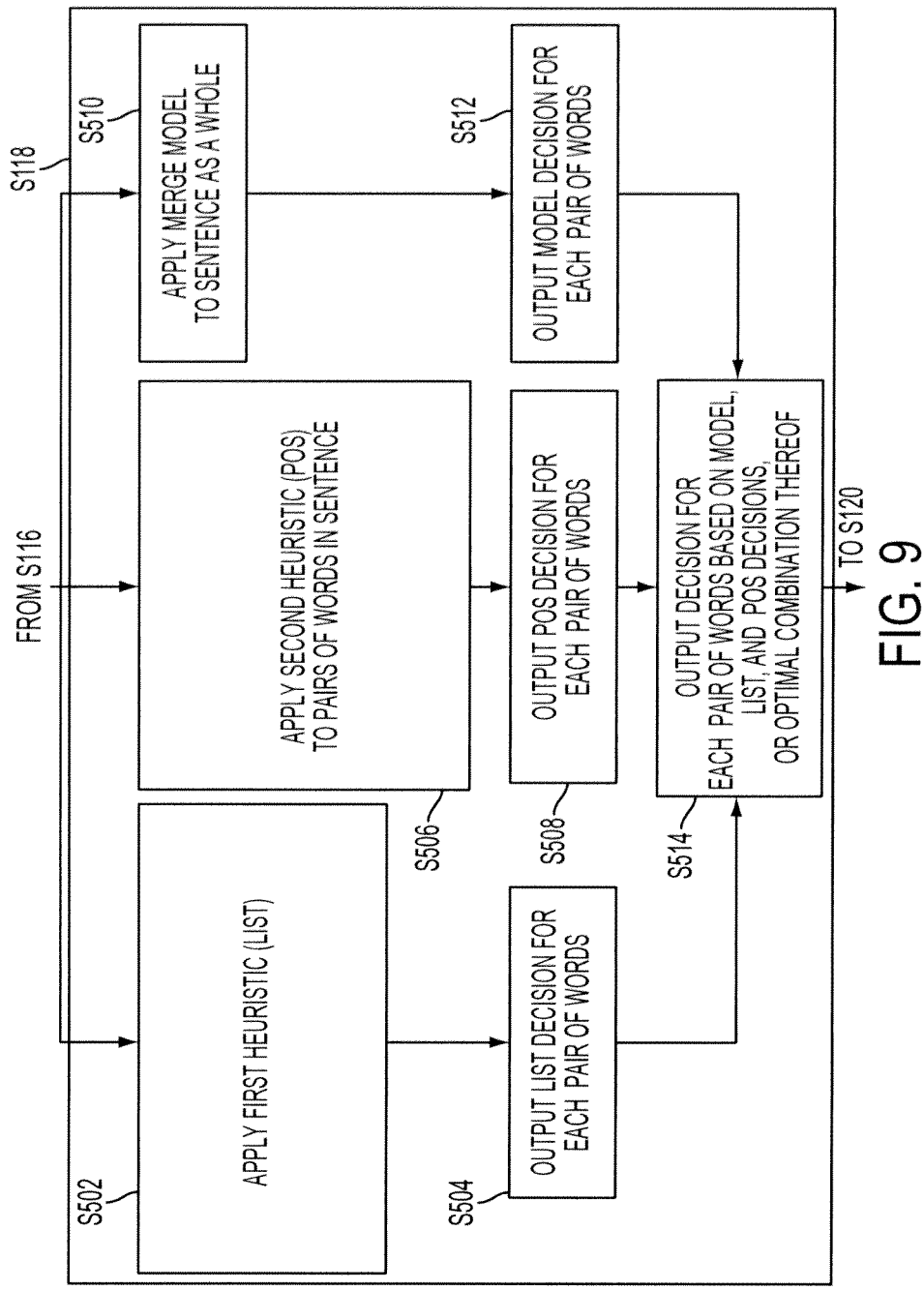

The merging decision using METHOD 2 can thus proceed as shown in FIG. 8. At S400, for the sequence 56, the feature vector for each pair of sequential words is computed by the merging component 58. At S402, all of these vectors, as a sequence, are input to the trained merge model 60. The trained merge model is thus applied to the sentence 56 as a whole. The model 60 computes a set of merging decisions, one decision for each sequential pair of words, for the sequence 56. At S404, the output of the merge model provides all the merging labels L (MODEL decisions).

One advantage of METHOD 2 is that it can be used when no parts of speech are available for the target translation 56. In this case, other features than parts of speech are used as the features.

Combining Heuristic-Based and Sequence-Based Methods

As will be appreciated, the heuristics-based and sequence-based methods can be combined in making merging decisions, for example, by merging when any one method decides to merge, or only under certain conditions. For example, a merge decision could be made if LIST OR (both POS AND MODEL) would merge.

Figure 10:
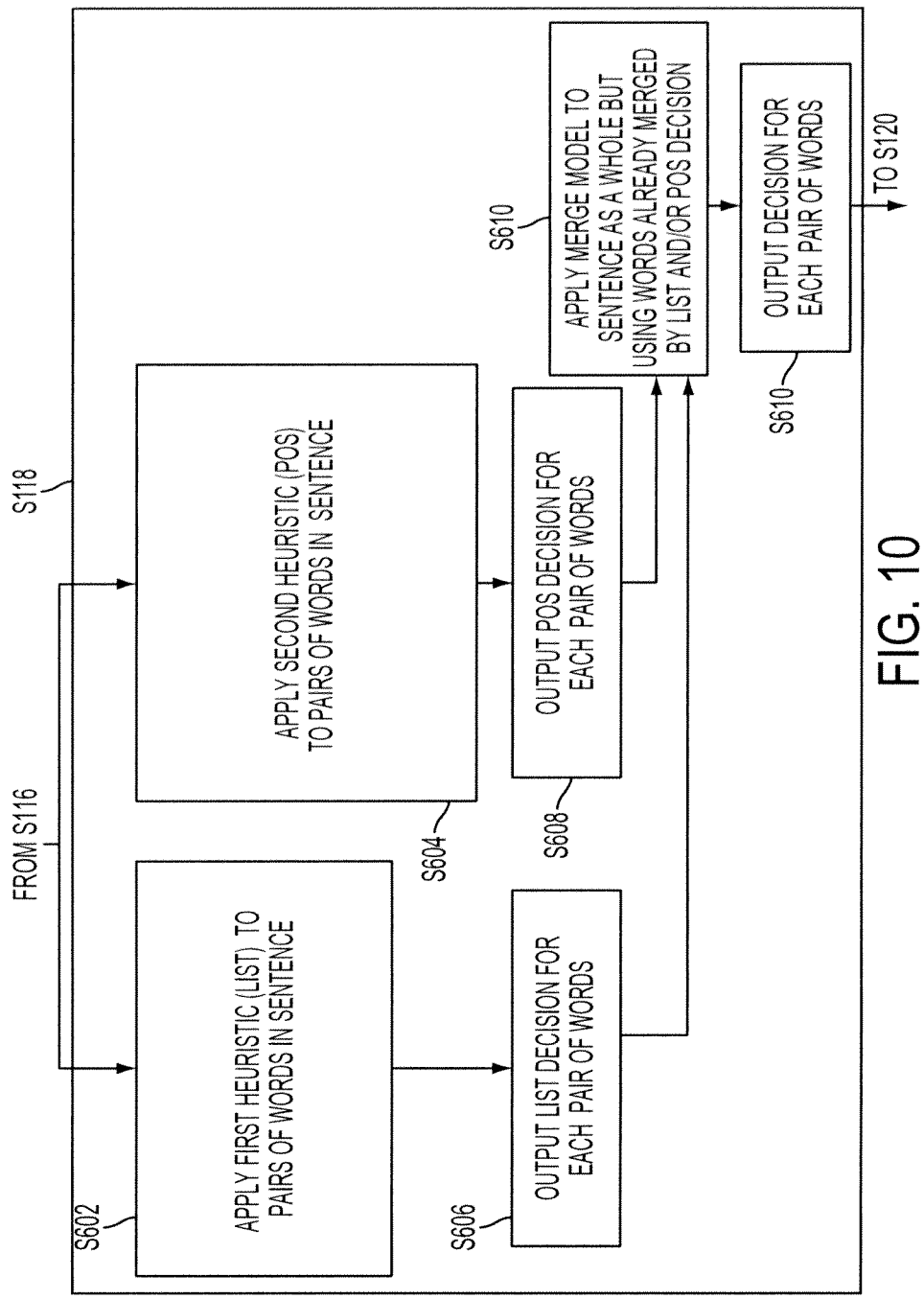

By way of Example FIG. 10 shows one exemplary combination method. Here, each of the heuristics LIST and POS is applied, as discussed above (S502, S506) as well as the merge model (S510). Their outputs S504, S508, S512, are combined to produce the final merge decisions S514.

FIG. 11 shows another exemplary combination method. In this method the heuristic-based method (METHOD 1) is applied first and any words which METHOD 1 decides to merge are pre-merged in the input to the merge model 60. For example, one or both of the heuristics POS and LIST is applied (S602, S604), as described above, and their LIST and/or POS decisions output (S606, S608) are input to merge model at S610 as premade merge decisions. The merge model 60 then makes decisions for the remaining word pairs, using the sequence-based approach. Thus, for example, if POS or LIST decided to merge fremd and sprachen, in the example translation 56, then the merge model 60 would receive, as input the decision L3 in FIG. 4 of merge.

Training Data

The training data 68 used for parameter estimation (S222) could be generated in S218 by asking a human expert to manually annotate a set of target sentences where compounds have been split, selecting a label L for each possible merging point. If features are strongly lexicalized, however, as in the case above, a suitably large training dataset 68 is desirable to avoid overfitting, making manual labeling impractical for many applications. In one embodiment, training data T' is created automatically from decomposed corpus 42, using a set of merging heuristics, e.g., the LIST and POS heuristics described above for the heuristics-based method, plus a third one made possible at parameter estimation time by the availability of a reference translation T, from corpus 36:

1. two consecutive tokens are merged if they appear combined with one another in the list of compound words 38, but only if their observed frequency $f_1$ (in corpus 36) as a compound word is larger than their frequency $f_2$ as a bigram;

2. two consecutive tokens are merged if their RPOS tags indicate merging;

3. two consecutive tokens are merged if the two tokens are observed combined in the reference translation T in corpus 36 (possibly as a sub-sequence of a longer word).

One method for generate a training dataset may include applying a selected compound splitting preprocessing method to the target side 36 of the parallel training corpus for the SMT system to generate decomposed corpus 44. Separation points where merge should occur are thus automatically identified as being the split locations. In practice, however, merging decisions are taken on the noisy output 56 of the SMT system, and not on the clean training data. Another method may thus include holding out, from SMT training (S202), a large fraction of the training data 42, 44, using the trained SMT model 54 to translate the source side of the training data 42, and then labeling decision points in the resulting target translations according to the above heuristics. This may involve making a large fraction of the data unavailable to training of the SMT model 54. A third alternative (used in the Examples below), is a blend of these methods. In this method, the SMT system is trained in S202 on the whole training data 42, 44. With the trained SMT model 54, the whole source side of the training data 42 is translated, then decision points in the translated sentences are labeled according to the heuristics above. The translations are thus biased, as they are generally of higher quality than those which may be expected to be obtained on unseen data. Nevertheless they are more similar to what may be observed in operations than the target side 44 of the training data itself.

The set of merging heuristics used for generating the training data can be selected empirically, based on which work best with the training set, or the same heuristics can be used, irrespective of the training set.

As will be appreciated, different combinations of methods can be used for generating training data 68.

The method(s) illustrated in FIGS. 2, 3, and/or 6-10 may be implemented in a computer program product that may be executed on a computer. The computer program product may include a non-transitory computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the method(s) may be implemented in transitory media, such as a transmittable carrier wave in which the control program is embodied as a data signal using transmission media, such as acoustic or light waves, such as those generated during radio wave and infrared data communications, and the like.

The exemplary method(s) may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing one or more of the flowchart(s) shown in FIGS. 2, 3, and 6-10 can be used to implement the translation method.

Without intending to limit the scope of the exemplary embodiment, the following Examples illustrate applications of the exemplary method to different datasets.

EXAMPLES

Datasets

Three datasets were used for testing the method. These datasets each include a parallel corpus of documents:

1. English-Swedish Europarl documents (produced by the European parliament) (Europarl Swedish), with Swedish being the target language 2. Swedish-English Automotive documents (Automotive Swedish) with Swedish being the target language 3. Danish-English Automotive documents (A/EN-DK) with Danish being the target language Statistics of the datasets are summarized in Table 2. For each dataset, a set of 1,000 sentences were held out for "validation", and 1,000 sentences as a "test" set. The validation data was used both to compare the heuristics against one another and to select hyper-parameters for the machine-learning based Conditional Random Fields (CRF) approach (METHOD 2).

TABLE 2

Overview of the Experimental Settings

| | Europarl Swedish | Automotive Swedish | Automotive Danish |
|---|---|---|---|
| Compounds split | N, V, Adj | N, V, Adj | N |
| POS tag-sets | POS | POS, RPOS | RPOS |
| Decoder | Moses | Matrax | Matrax |
| Training sentences for SMT | 1,520,549 | 329,090 | 168,047 |
| Training words SMT (target) | 34,282,247 | 3,061,282 | 1,553,382 |
| Training sentences for CRF | 248,808 | 317,398 | 164,702 |
| Training words for CRF | 4,908,351 | 2,973,638 | 1,438,818 |
| Extra training sentences (words) for CRF | 3,000 | 3,000 | 163,201 (1,757,238) |

Heuristics for Compound Merging

Alternative combinations of heuristics POS, LIST, and a reference-based method REF (a heuristic that merges if the compound is found in the reference translation, as described above) were evaluated on the three validation datasets: Automotive Swedish, Europarl Swedish, and Automotive Danish. Two of the heuristics, POS and LIST, can be applied to the output at translation time, either in isolation, or combined. Their performance is shown in Table 3. tp=true positives, i.e., merged word pairs which are correctly merged, tn=true negatives, i.e., word pairs which are correctly not merged, fp=false positives, i.e., word pairs which are incorrectly merged, and fn=false negatives, i.e., word pairs which are not merged, but which should have been. The correct values are what which should have been observed.

TABLE 3

True and False Positives and negatives of the heuristic validation data

| | tp | tn | fp | fn |
|---|---|---|---|---|
| Swedish Automotive | | | | |
| Correct | 625 | 7477 | | |
| LIST | 621 | 7470 | 7 | 4 |
| POS | 602 | 7462 | 15 | 23 |
| LIST + POS | 625 | 7459 | 18 | 0 |
| Swedish Europarl | | | | |
| Correct | 1439 | 23256 | | |
| LIST | 1413 | 23245 | 11 | 26 |
| POS | 602 | 23225 | 19 | 31 |
| LIST + POS | 1433 | 23226 | 30 | 6 |
| Danish Automotive | | | | |
| Correct | 432 | 7321 | | |
| LIST | 327 | 7309 | 12 | 105 |
| POS | 46 | 7313 | 8 | 16 |
| LIST + POS | 426 | 7301 | 20 | 6 |

Evaluation of the different heuristics on the validation files from the three corpora is shown in FIGS. 11-13. The number in each region of the Venn diagrams indicates the number of times a certain combination of heuristics fired (i.e. the number of positives for that combination). The two smaller numbers below indicate the number of true and false positives, respectively. Venn diagram regions corresponding to what may be considered unreliable combinations of heuristics have corresponding figures on a grey background.

Thus, for example, on the Automotive English-Swedish corpus shown in FIG. 11, the REF heuristic fired (decided to merge) on 460 occasions; in 448 of these, POS and LIST also fired, and in 12, LIST also fired, but not POS. When all three fired, the results were OK (no incorrect positives found in at least the first 100 checked). POS fires 15 times without LIST and REF firing, and of these, only 4 are true positives. Thus, it may be concluded that for this dataset, the cases where POS fires on its own, i.e., without REF and LIST, are not useful for making the merging decision. It can also be seen that the LIST and POS heuristics have complementary sets of false negatives: when merging on the OR of the two heuristics, the number of false negatives decreases drastically, more than compensating for the inevitable increase in false positives. REF does not add any benefit to the combination of LIST and POS in this dataset.

The first 100 sentences of each validation set were reviewed, looking for words that should be merged, but were not marked by any of the heuristics (false negatives for all three heuristics). In no case were any such words found, so it can be assumed that between them, the heuristics can find the overwhelming majority of all compounds to be merged.

Compound Merging as Sequence Labeling

An evaluation was also performed to identify the best combination of the heuristics available at training time (LIST, POS, and REF) to use to create automatically the training data for the CRF-based model (S218). The best results on the validation data are obtained by different combination of heuristics for the three datasets, as could be expected by the different distribution of errors in FIGS. 11-13. In the experiments conducted, the CRF was trained using, for each dataset, the combination of heuristics corresponding to leaving out the grey portions of the Venn diagrams in FIGS. 11-13 were generally used. This sort of preliminary optimization involves hand-labeling a certain amount of data. Based on these experiments, skipping this optimization and just using REF V (LIST $\wedge$ POS) (the optimal configuration for the Swedish-English Europarl corpus) seems to be a reasonable alternative.

The validation data was also used to set a frequency cut-off for feature occurrences (set at 3 in the following experiments) and the regularization parameter in the CRF objective function. Results are largely insensitive to variations in these hyper-parameters, especially to the CRF regularization parameter.

The overall merging results of the heuristics, the best sequence labeler, and the sequence labeler without POS are shown in Table 4.

TABLE 4

False Positives and False Negatives for different compound merging methods on devtest and on held-out test data

| | Devtest | | Test | |
|---|---|---|---|---|
| | fp | fn | fp | fn |
| Auto, Swedish | | | | |
| LIST | 7 | 4 | 11 | 14 |
| POS | 15 | 23 | 6 | 16 |
| LIST V POS | 18 | 0 | 11 | 1 |
| CRF (REF V LIST) | 8 | 1 | 8 | 8 |
| CRF (without POS) | 8 | 2 | 10 | 9 |
| Europarl, Swedish | | | | |

TABLE 4-continued

False Positives and False Negatives for different compound merging methods on devtest and on held-out test data

|  | Devtest | | Test | |
|---|---|---|---|---|
|  | fp | fn | fp | fn |
| LIST | 11 | 26 | 18 | 23 |
| POS | 19 | 31 | 16 | 38 |
| LIST∨POS | 30 | 6 | 34 | 1 |
| CRF (REFV(LIST∧POS)) | 9 | 17 | 7 | 32 |
| CRF (without POS) | 32 | 17 | 30 | 18 |
| Auto, Danish | | | | |
| LIST | 12 | 105 | 3 | 97 |
| POS | 8 | 16 | 8 | 29 |
| LIST∨POS | 20 | 6 | 10 | 5 |
| CRF (REFVLIST∨POS) | 10 | 3 | 9 | 14 |
| CRF (without POS) | 3 | 45 | 7 | 15 |

Among the heuristics, the combination of the LIST heuristic and the POS heuristic performs best in all cases except on the devtest for Swedish Auto, where the LIST strategy alone is best. On the devtest data, the best CRF sequence labeler is always slightly better than the best heuristic. On the test data however, the best heuristic is slightly better than the sequence labeler. The overall tendency though, is that the sequence labeler has fewer false positives than the best heuristic, which is advantageous, since erroneously merged compounds are more disturbing for a reader or post-editor than non-merged compounds.

The sequence-labeling approach can also be used in the absence of a POS tagger, which can be advantageous if no such tool of suitable quality is available for the target language and the domain of interest. To demonstrate the feasibility of such a method, a CRF-based compound merger was trained without using POS features, and without using the POS-based heuristic when constructing the training data. Compared to the CRF with access to POS tags, on devtest data, accuracy goes down on the Europarl Swedish data and the Automotive Danish data, and is unchanged on Automotive Swedish. On test data, performance deteriorates on the Swedish Europarl dataset, but remains basically unchanged on the two Automotive corpora. Compared to the LIST heuristic (the only reasonable alternative available in the absence of a POS tagger), results appear somewhat worse on Swedish Europarl, essentially the same on Swedish Automotive, and definitely better on Danish Automotive.

The exemplary methods for deciding if and how to merge word compounds are thus either competitive with, or superior to, existing methods. The LIST heuristic, which involves checking whether the first of two consecutive words has been observed in a corpus as a compound modifier, and their combination has been observed as a compound, and only merging words if their corpus frequency as a compound is larger than their frequency as a bi-gram, is found to be effective. False negatives of the LIST heuristic and of the POS heuristic based on Part-of-Speech tags are found to be complementary, and thus a logical OR of them generally improves over both heuristics performed individually. The sequence labeling method, tested with one model, Conditional Random Fields, using a set of features similar to what is accessible to the heuristics, showed that it gives very competitive results.

Depending on the choice of the features, the sequence labeling approach has the potential to be truly productive, i.e., to form new compounds in an unrestricted way. This is the case with the feature set experimented with. The LIST heuristic is not productive: it can only form a compound if this was already observed as such in the corpus 36. The POS-based heuristic presents some limited productivity. Since it uses special POS tags for compound modifiers, it can form a compound provided its head has been seen alone or as a head, and its modifier(s) have been seen elsewhere, possibly separately, as modifier(s) of compounds. The sequence labeling approach can, in principle, decide to merge two consecutive words even if neither was ever seen before in a compound. An investigation of the data shows that there were some novel compounds merged by the sequence labeler that were not identified with either of the LIST and POS heuristics. In the test data, for example, knap+start (button start) and vand+nedsæ nkning (water submersion) were found in Danish Auto, and kvarts sekel (quarter century) bostad(s)+ersättning (housing grant) in Swedish Europarl. This confirms that the sequence labeler, from automatically labeled data based on heuristics, can learn to merge new compounds that the heuristics themselves cannot handle.

If the linguistic resources for extracting some of the features, e.g., a POS tagger, are unavailable (or are available only at training time but not in operations), the sequence-labeling method can still be applied, although with slightly reduced effectiveness.

Experiments on the three datasets show that the improved and combined heuristics perform generally better than any already known method, and that besides being fully productive, the sequence-labeling version is highly competitive, tends to generate fewer false positives, and can be used flexibly with limited or no linguistic resources.

Finally, it is to be appreciated that the CRF model could use different set of features than those experimented with and that fine tuning of these features could result in further improvements in performance.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for making merging decisions for a translation comprising:
providing a translated text string in a target language of a source text string in a source language;
with a merging system, wherein the merging system is implemented with a computer processor, outputting decisions on merging of pairs of words in the translated text string, the merging system comprising at least one of:
a set of stored heuristics comprising at least a first heuristic by which two consecutive words in the string are considered for merging if an observed frequency $f_1$ of the two consecutive words as a closed compound word is larger than an observed frequency $f_2$ of the two consecutive words as a bigram, and
a merging model trained on features associated with pairs of consecutive tokens of text strings in a training set and predetermined merging decisions for the pairs to predict merging decisions for a new translated text string; and
outputting a translation in the target language based on the merging decisions for the translated text string.

2. The method of claim 1, wherein the merging system comprises the set of heuristics.

3. The method of claim 2, wherein in the first heuristic, two consecutive words in the string are considered for merging the first word of the two consecutive words is recognized as a compound modifier and if the observed frequency $f_1$ of the two consecutive words as a closed compound word is larger than the observed frequency $f_2$ of the two consecutive words as a bigram.

4. The method of claim 3, wherein in applying the first heuristic a list of recognized compound modifiers is accessed, the list including compound modifiers observed when compound words in a training corpus in the target language were split using predetermined splitting rules.

5. The method of claim 2, wherein the set of heuristics further includes a second heuristic by which two consecutive words in the string are considered for merging based on part of speech tags assigned to the two words, the part of speech tags being selected from a restricted part of speech tagset, at least one of the restricted part of speech tags being configured for identifying a word from the target language as being one which also forms a part of a known closed compound word in the target language.

6. The method of claim 5, wherein two consecutive words in the target text string are merged if at least one of the first and second heuristics considers the two consecutive words for merging.

7. The method of claim 1, wherein the merging system comprises the merging model, the method further comprising extracting features for pairs of consecutive words in the translated target string.

8. The method of claim 7, wherein the features are selected from the group consisting of features based on:
   a. a surface word form: word−1, word+1, where word−1 represents a first word of a pair of consecutive words in the translated text string and word+1 represents a second word of the pair, positioned after the first word;
   b. parts-of-speech: POS−1, POS+1, where POS−1 is a part of speech assigned to word−1 and POS+1 is a part of speech assigned to word+1;
   c. a character n-gram comprising n characters from the end of word−1 and m characters from the start of word+1, wherein m+n is at least 2;
   d. a character n-gram comprising n characters from the end of word−1 and m characters from the start of word+1, wherein the character n-grams are normalized by replacing characters are with phonetic approximations, and grouped into groups with similar phonetic distribution; and
   e. a frequency, in a training corpus, of at least one of:
      a bigram represented by word−1 word+1,
      a closed compound word derived from word−1 and word+1,
      a closed compound word derived from word−1 and another word, and
      a closed compound derived word from word+1 and another word.

9. The method of claim 7, wherein the merging model has been trained automatically on a set of pairs of target text strings, each pair comprising a first target text string and a second target text string in which at least one consecutive pair of the words in the first string are identified to be merged to form a closed compound word.

10. The method of claim 9, wherein at least some of the pairs of target text strings are artificially generated using a heuristic for forming closed compound words.

11. The method of claim 7, wherein the merging model is one which has been trained with a sequence labeling machine learning algorithm.

12. The method of claim 7, further comprising automatically generating training data for training the merging model.

13. The method of claim 12, wherein the automatic generating training data for training the merging model comprises applying a stored set of merging heuristics to decomposed text in the target language and extracting merging decisions therefrom.

14. The method of claim 7, wherein the merging model computes an optimal set of merging decisions over all pairs of words in the target text string.

15. The method of claim 1, wherein each of the decisions on merging includes a decision on whether first and second words are to be merged and optionally, for words which are to be merged, a merging rule which specifies a local modification of at least one of the words at their boundary, the merging rule being selected form a predetermined set of merging rules.

16. The method of claim 1, wherein the providing of the translated text string in the target language of the source text string in the source language comprises, translating the source text string with a decoder which has been trained on a parallel training corpus comprising source language text strings and decomposed target language text strings formed by decomposing closed compound words of target language text strings corresponding to the source language text strings.

17. A computer program product comprising a non-transitory computer-readable recording medium which stores instructions for performing the method of claim 1.

18. A system for making merging decisions comprising memory which stores instructions for performing the method of claim 1 and a processor in communication with the memory for executing the instructions.

19. A translation system comprising:
   a decoder which receives as input a source text string in a source language and outputs a translated text string in a target language in a target language, based on the source text string;
   a merging system, which receives the translated text string and outputs a translation in the target language based on translated text string, the merging system being configured for outputting decisions on merging of pairs of words in the translated text string, the merging system comprising at least one of:
      a set of stored heuristics comprising at least a first heuristic by which two consecutive words in the string are considered for merging if the observed frequency $f_1$ of the two consecutive words as a closed compound word is larger than an observed frequency $f_2$ of the two consecutive words as a bigram, and, optionally, if the first word of the two consecutive words is also recognized as a compound modifier, and
      a merging model trained on features associated with pairs of consecutive tokens of text strings in a training corpus and predetermined merging decisions for the pairs to predict merging decisions for a new translated text string.

20. The system of claim 19, wherein the merging system comprises software instructions stored in memory and a processor for executing the instructions.

21. The system of claim 19, further comprising memory which stores a list of closed compounds in the training corpus and their associated frequencies $f_1$ and $f_2$.

22. The system of claim 19, wherein the translated text strings output by the decoder have fewer closed compound words, on average, than the corresponding translations output by the merging system.

* * * * *